United States Patent
Li et al.

(10) Patent No.: US 10,779,541 B2
(45) Date of Patent: Sep. 22, 2020

(54) HARD SURFACE MADE UP OF MATERIAL INCLUDING AN ANTIMICROBIAL EXFOLIATED VERMICULITE COMPOSITE MATERIAL AS A SANITIZER

(71) Applicants: Bowen Li, Chassell, MI (US); Jiann-Yang Hwang, Chassell, MI (US)

(72) Inventors: Bowen Li, Chassell, MI (US); Jiann-Yang Hwang, Chassell, MI (US)

(*) Notice: Subject to any disclaimer, the term of this patent is extended or adjusted under 35 U.S.C. 154(b) by 0 days.

(21) Appl. No.: 14/855,432

(22) Filed: Sep. 16, 2015

(65) Prior Publication Data

US 2016/0073638 A1     Mar. 17, 2016

Related U.S. Application Data

(63) Continuation of application No. 12/928,101, filed on Dec. 3, 2010, now Pat. No. 9,150,453.

(51) Int. Cl.
| | |
|---|---|
| *A61K 9/50* | (2006.01) |
| *A61K 31/14* | (2006.01) |
| *A01N 59/20* | (2006.01) |
| *C04B 20/06* | (2006.01) |
| *A01N 59/16* | (2006.01) |
| *C01B 33/42* | (2006.01) |
| *C04B 14/20* | (2006.01) |
| *C01B 33/38* | (2006.01) |

(52) U.S. Cl.
CPC ............. *A01N 59/20* (2013.01); *A01N 59/16* (2013.01); *C01B 33/38* (2013.01); *C01B 33/42* (2013.01); *C04B 14/206* (2013.01); *C04B 20/06* (2013.01)

(58) Field of Classification Search
CPC ........ C04B 20/06; C04B 14/206; A01N 59/16
See application file for complete search history.

*Primary Examiner* — Kyle A Purdy
(74) *Attorney, Agent, or Firm* — John R. Benefiel

(57) ABSTRACT

An antimicrobial exfoliated vermiculite composite material is synthesized by impregnating the interlayers of exfoliated vermiculite through cation exchange and surface absorption with at least one of the following metal species: copper, silver, zinc, and manganese. Alternately, the antimicrobial material is synthesized by impregnating interlayers of unexfoliated vermiculite with said metal species and exfoliating the product thereafter. The metal species can be in ionic state, nanometer particles, and in the form of metal oxides, metal hydroxides, metal nitrides, metal carbides, metal phosphates, metal silicates, metal borides, metal sulfides, metal halides, metal hydrides, metal nitrates, metal carbonates, and metal sulfadiazines. Any mixture of these metal species in the exfoliated vermiculite can provide protection against a broad spectrum of pathogens. This antimicrobial material in any desired form, in whole or as an additive, can effectively self-decontaminate various materials or products as the antimicrobial metal ions slowly diffuse to the surface of the products.

2 Claims, 46 Drawing Sheets

300um

4um

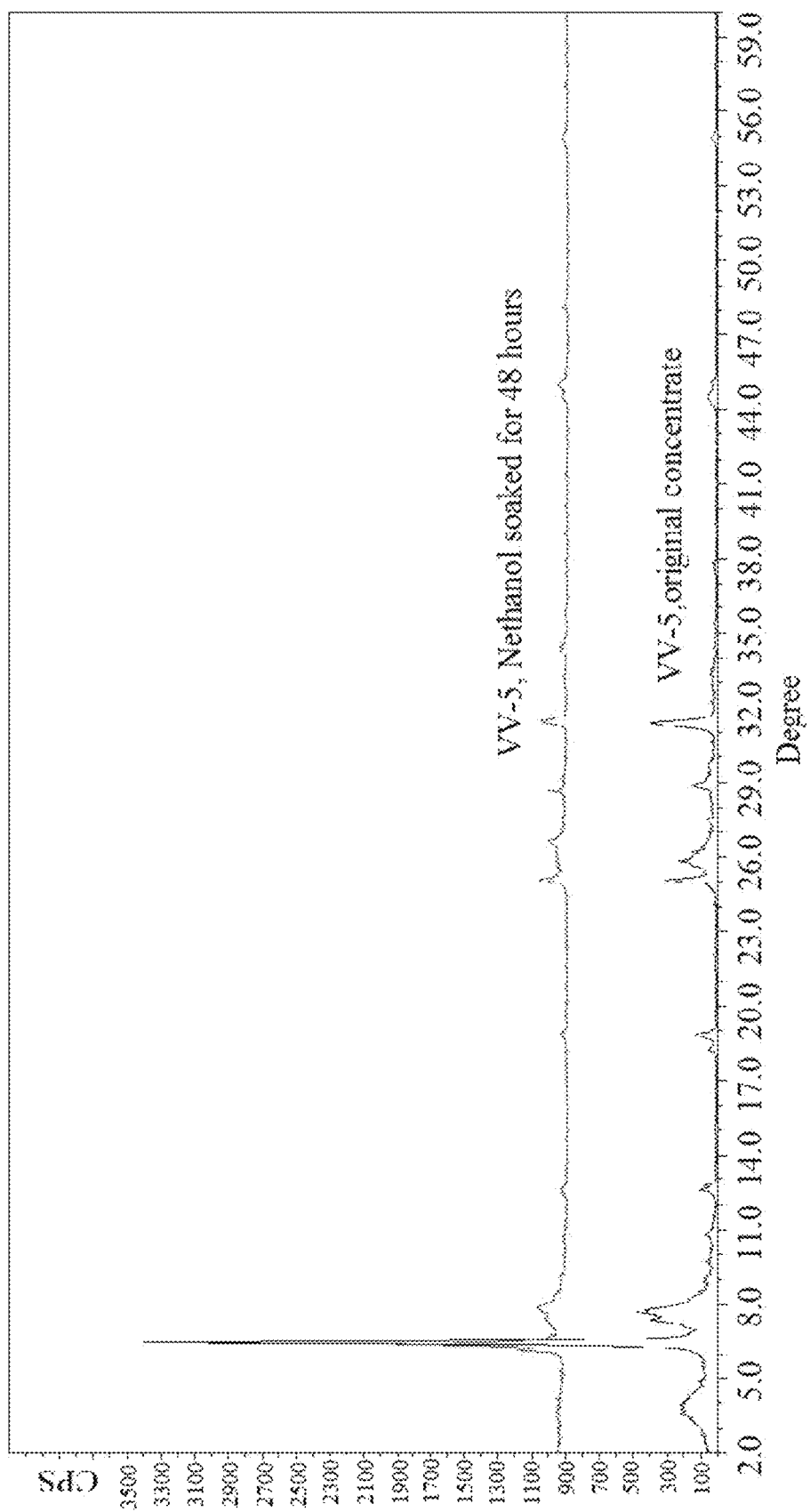

Leaching Speed of Metals from Exfoliated Copper Vermiculite

HARD SURFACE MADE UP OF MATERIAL INCLUDING AN ANTIMICROBIAL EXFOLIATED VERMICULITE COMPOSITE MATERIAL AS A SANITIZER

CROSS-REFERENCE TO RELATED APPLICATIONS

This application is a continuation of U.S. Ser. No. 12/928,101 filed Dec. 2, 2010, now U.S. Pat. No. 9,150,453 which claims the benefit of U.S. Ser. No. 61/266,372, filed Dec. 3, 2009 by the present inventors.

BACKGROUND OF THE INVENTION

1. Field of Invention

The present invention relates to an antimicrobial composite material and a method for producing the same. More particularly, the present invention relates to a single or multiple metal vermiculite composite material having antibacterial/antifungal activities, and to the method of making and using the same.

2. Discussion of Prior Art

Vermiculite is a naturally occurring layer-structured mineral, which is in the size of 0.1 mm to several centimeters, and composed of alterative aluminum silicate sheets and hydrate cation sheets. The cations in the interlayer region are exchangeable and can be easily replaced in the laboratory by cation exchange reaction. Within the interlayer regions of vermiculite, water molecules will transform into steam when rapidly heated to high temperature (around 850° C. or higher), causing the dramatic increase of volume of vermiculite particles (expansion, usually called exfoliation). Exfoliated vermiculite has very unique properties, such as high porosity, high specific surface area, high aspect ratio of laminates, low density, and high cation exchange capacity. Typically, the cation exchange capacity of vermiculite reach 50-150 mmol/100 g.

Vermiculite is extensively distributed in the United States and worldwide. Annually, over 100 thousand tons of vermiculite was produced, and over 150 thousand tons of vermiculite was consumed in the United States. Vermiculite has been extensively used in various industrial products and applications. Most vermiculite is consumed in thermally exfoliated form. These applications include agricultural growth media, lightweight aggregates, building boards, insulations, additives in coatings, plastics, fertilizers, papers, and wood products, etc. However, there is no report on the making of antimicrobial exfoliated vermiculite.

Currently, there have been some reports on making antimicrobial additive with clay minerals, such as montmorillonite, bentonite, kaolinite. Clay minerals have similar silicate sheets and cation exchange property with vermiculite. However, vermiculite is significantly distinguished itself from clay minerals by its natures, such as unique interlayer cations, high layer charge that results in a high cation exchange capacity, unique exfoliation function, and a larger particle size. Further, exfoliated vermiculite has unique properties, such as lightweight, high porosity, and high surface absorption.

It has been found that some transition metals, such as silver, copper, zinc, nickel, and manganese, exhibit antimicrobial activities. Numerous attempts have been made to utilize this property to various applications. For example, U.S. Pat. No. 5,009,898 describes antimicrobial hydroxyapatite powders containing hydroxyapatite powder and metal ions selected from silver, copper and zinc ions.

U.S. Pat. No. 5,441,717 describes process for producing antimicrobial compounds by forming metal salts of silver, copper, zinc, tin, mercury, lead, iron, cobalt, nickel, manganese, arsenic, antimony, bismuth, barium, cadmium and chromium.

U.S. Pat. No. 5,503,840 exposures an antimicrobial composition containing titanium dioxide, barium sulfate, zinc oxide particles, and mixtures thereof having successive coatings of silver, in some cases a coating of zinc and/or copper compounds such as zinc oxide, copper (II) oxide and zinc silicate; silicon dioxide; alumina. This composition made up of polymer, which also is the host of metals.

U.S. Pat. No. 6,143,318 describes an antimicrobial composition containing copper, silver, magnesium, zinc, cerium, manganese bismuth, selenium and boron. In this composition, antimicrobial metals were held by glass.

U.S. Pat. No. 5,298,253, disclosed a granular copper hydroxide dry flowable bactericide/fungicide. In this process, copper hydroxide was admixed with bontonite, and dried granules were formed by spray drying method.

U.S. Pat. No. 4,497,869 describes formed product of vermiculite (bulk density of from 0.9 to 2.5 (g/cm.sup.3)) containing metal salts by mixing process, to improve the water resistance and strength of products.

U.S. Pat. No. 4,210,530 describes the treatment of metal plating wastes with an unexpanded vermiculite cation exchange column, which employs unexfoliated vermiculite as an absorption to filter heavy metals such as copper.

Summarily, there is no report on preparation and application of exfoliated vermiculite antimicrobial compound. In addition, only ionic metals and their nanoparticles perform antimicrobial activity. These metallic ions also need an effective carrier for their loading, desirable release rate, chemical stability, and durability for their appropriate uses. How to hold and release the ionic metals appropriately is a significant issue to the development and applications of metal ion-typed antimicrobial materials. Vermiculite can provide a consistent and effective delivery vehicle for antimicrobial agents. Metal ions in the interlayer of vermiculite can be slowly released via cation exchange and delivered to the surface of particles by diffusion.

OBJECTS AND ADVANTAGES

Accordingly, it is an object of this invention to provide a safe, wide-spectrum, efficient, very durable, inexpensive single-metal or multi-metal antimicrobial compound that can be used as an additive for self-decontamination of various materials and products.

SUMMARY OF THE INVENTION

Briefly, the present invention provides a novel antimicrobial exfoliated vermiculite compound comprising exfoliated vermiculite and metal ions having antimicrobial properties.

The antimicrobial exfoliated vermiculite compound is prepared by implanting antimicrobial metallic ions into the structure of exfoliated vermiculite through cation exchange reaction and surface absorption.

This antimicrobial exfoliated vermiculite compound can be in powder form, applicable as an additive to mix in diverse products, such as plastics, paints, wood products, papers, leather, textiles, concretes, etc. This exfoliated vermiculite antimicrobial additive slowly releases antimicrobial cations, thus providing the products with antimicrobial properties.

DRAWINGS

FIG. 1—Sketch of unexfoliated copper vermiculite (left) and exfoliated copper vermiculite (right). Lines represent aluminum silicate sheets and dots represent copper cations.

FIG. 2—Scanning Electron Microscopy (SEM) images of laminates of unexfoliated vermiculite (left) and a grain of exfoliated vermiculite (right).

FIG. 3—Bactericide activity of unexfoliated copper vermiculite [incubated time (hrs.) vs viable bacteria ($\log_{10}$CFU/ml)].

FIG. 4—Bactericide activity of exfoliated copper vermiculite [incubated time (hrs.) vs survivors ($\log_{10}$CFU/ml)].

FIG. 5—Differential thermal analysis of unexfoliated vermiculite.

FIG. 6—Differential thermal analysis of exfoliated vermiculite.

FIG. 7—shows the general spread approaches of infectious bacteria from infectious sources to potential hosts.

FIG. 8—shows the major determination methods for removing microbes. Left part is physical as right part is chemical.

FIG. 9—shows the crystal structure of Mg-vermiculite projected on (010) plane.

FIG. 10—shows the concept of copper vermiculite using as antimicrobial materials. Top: preparation of copper vermiculite; lower: applications of copper vermiculite.

FIG. 11—shows particle size distribution of jet-milled vermiculite powder (VV-CCE).

FIG. 12A—shows the SEM images of vermiculite particles

FIG. 12B—shows the SEM images of vermiculite particles VV-CCE.

FIG. 12C—shows the SEM images of vermiculite particles VV-7.

FIG. 13—shows XRD patterns of VV-5, VV-CCE and VV-7. V(001)—(001) peak of vermiculite; B—new (001) peak of vermiculite after exfoliation; M—magnesiohonblende.

FIG. 14—shows a new peak (Site B, $d_{001}$=0.9818 nm) only occurs after calcining VV-CCE at 950° C. A—(001) peak of vermiculite.

FIG. 15—shows a new peak (Site B, $d_{001}$=0.9818 nm) resulted from calcining VV-5 at 950° C. A—(001) peak of vermiculite.

FIG. 16—shows a flowchart of CEC sampling of ammonium-vermiculite.

FIG. 17—shows a flowchart of ammonium measurement of vermiculite.

FIG. 18—shows interlayer spacing of vermiculite (VV-CCE) reduced after cation exchange with ammonium. (A)—original (001) peak; (B)—new (001) peak after cation exchange.

FIG. 19—shows interlayer spacing of vermiculite (VV-5) reduced after cation exchange with ammonium. (A)—original (001) peak; (B)—new (001) peak after cation exchange.

FIG. 20—shows interlayer spacing of vermiculite (VV-7) reduced after cation exchange with ammonium. (A)—original (001) peak; (B)—new (001) peak after cation exchange.

FIG. 21A—structure comparison of vermiculite before and after soaking using methanol concentrate. coarse ammonium-vermiculite vs. VV-5.

FIG. 21B—structure comparison of vermiculite before and after soaking using methanol concentrate (micron-sized ammonium-vermiculite vs. VV-CCE).

FIG. 22A—shows SEM images of jet-milled Virginia vermiculite (VV-CCE).

FIG. 22B—SEM image of jet-milled Virginia vermiculite.

FIG. 23A—shows SEM images of copper vermiculite (MCV).

FIG. 23B—SEM image of copper vermiculite.

FIG. 24A—SEM image of exfoliated vermiculite (VV-7).

FIG. 24B—SEM image of exfoliated vermiculite (VV-7).

FIG. 25A SEM images of exfoliated copper vermiculite (MECV).

FIG. 25B—SEM image of exfoliated copper vermiculite (MECV).

FIG. 26—shows comparison of XRD patterns of copper vermiculite (MCV) and Jet-milled vermiculite (VV-CCE).

FIG. 27—shows comparison of XRD patterns of exfoliated copper vermiculite (MECV) and exfoliated vermiculite (VV-7).

FIG. 28—shows layered structure model of copper vermiculite. Cu (hydrated form) is located in the interlayer regions of aluminosilicate sheets, enabling the slow-release of Cu when added in materials. (Projection normal to ac plane).

FIG. 29—shows relation of absorption versus bacterial density of *S. aureus*.

FIG. 30—shows relation of absorbance vs. bacteria density of *E. coli* (CFU/ml) at 600 nm.

FIG. 31—shows procedure for determining presence of antimicrobial activity—liquid diffusion method (for supernatant). (Modified from ASTM 2149 term 12).

FIG. 32—shows procedure for determining presence of antimicrobial activity—solid diffusion method (for powder disc).

FIG. 33—shows antibacterial efficiency of supernatants of jet-milled vermiculite and copper vermiculite against *S. aureus*. Left-jet-milled vermiculite, boiled at 80° C. for 3 hour; right-copper vermiculite, leached with shaking for 1 hour. Picture was taken after plates incubated at 37° C. for 24 hours.

FIG. 34—shows antibacterial efficiency of supernatants of coarse vermiculite (VV-5) and coarse copper vermiculite against *S. aureus*. Left—leaching solution of coarse vermiculite (shaked for 1 hour); right—coarse copper vermiculite (shaked for 1 hour). Picture was taken after incubated at 37° C. for 24 hours.

FIG. 35—shows antibacterial efficiency of supernatants of copper vermiculite (MCV) and exfoliated copper vermiculite (MECV) against *S. aureus*. Left- leaching solution of MCV; right-leaching solution of MECV. Solutions were shaked for 1 hour while leaching. Pictures were taken after plates incubated at 37° C. for 14 hours.

FIG. 36—shows antibacterial efficiency of supernatants (28 days shaking) of copper vermiculite (MCV) and exfoliated copper vermiculite (MECV) against *S. aureus*. Upper-MCV; lower-left-MECV; lower-right-distilled water. Test sample were leaching for 28 days with shaking. Pictures were taken after plates incubated at 37° C. for 14 hours.

FIG. 37—shows antibacterial efficiency of supernatants of copper vermiculite (MCV) and exfoliated copper vermiculite (MECV) against *K. pneumoniae*. Left-MCV; right-MECV, leaching solution after shaking for 1 hour. Picture was taken after incubated for 18 hours.

FIG. 38—shows antibacterial efficiency of supernatants of copper vermiculite (MCV) and exfoliated copper vermiculite (MECV) against *E. coli*. (Incubated at 37° C. for 24 hours; left-MCV; right-MECV).

FIG. 39—shows antibacterial efficiency of supernatants (28 days leached) of copper vermiculite (MCV) and exfoliated copper vermiculite (MECV) against *E. coli*. Upper- MCV; lower-left-MECV; lower-right-distilled water. Test solutions were leached for 28 days with shaking (Incubated at 37° C. for 24 hours).

FIG. 40—shows antibacterial effect of copper vermiculite (MCV) disc against S. aureus. Left-VV-CCE (control, 0.05 g); right-MCV (0.05 g). Media used was TGEA. Pictures were taken after plates incubated at 37° C. for 24 hours.

FIG. 41—shows antibacterial effect of copper vermiculite (MCV) disc against *S. aureus* on TSA. Left—MCV, dried powder (0.05 g); right—VV-CCE, dried powder (0.05 g, control). Pictures were taken after incubated at 37° C. for 14 hours.

FIG. 42—shows antibacterial effect of exfoliated copper vermiculite (MECV) disc against *S. aureus* on TSA. Left—MECV (0.02 g); right—VV-7 (0.02 g, control). Pictures were taken after incubated at 37° C. for 14 hours.

FIG. 43A—shows antibacterial effect of copper vermiculite (MCV) disc against *K. pneumoniae* on TSA.

FIG. 43b—antibacterial effect of copper vermiculite (MCV) disc against *K. pneumonia* on TSA (VV-CCE, control).

FIG. 44A—shows antibacterial effect of exfoliated copper vermiculite (MECV) disc against *K. pneumoniae*.-(MECV, 0.03G).

FIG. 44B—shows antibacterial effect of exfoliated copper vermiculite disc against *K. pneumonia* (control) (media: TSA).

FIG. 45—shows antibacterial effect of copper vermiculite (MCV) disc against *E. coli* on TSA. Upper-left—MCV (0.05 g); upper-right--VV-CCE (0.05 g, control). Lower-left—MECV (0.02 g); lower-right—VV-7 (0.02 g, control). Samples were incubated at 37° C. for 14 hours.

FIG. 46—shows the model of antibacterial effects of copper vermiculite by solid diffusion method. Cv—copper concentration in vermiculite; CI—copper concentration to effectively inhibit bacterial growth on agar surface.

FIG. 47—is the model of antibacterial effects of copper vermiculite (and exfoliated copper vermiculite) by liquid diffusion method. Cv—copper concentration in vermiculite; Cs—copper concentration in solution; CB—copper concentration at the edge of vermiculite particles; CI—copper concentration to effectively inhibit bacterial growth on agar surface.

FIG. 48—shows the copper vermiculite impacts on *E. coli*. Control—inoculum only in buffer solution; VVCCE—vermiculite (control 2) 10.0 mg, without Cu; content of Cu-vermiculite (Cu concentration) in solution: 1.0 mg =10 ppm (0.255 ppm); 5.0 mg=50 ppm (1.275 ppm); 10.0 mg=100 ppm (2.55 ppm); 20.0 mg=200 ppm (5.10 ppm).

FIG. 49—shows the exfoliated copper vermiculite impacts on *E. coli*. Control—inoculum only in buffer solution; content of exfoliated copper vermiculite (Cu concentration) in solution: 1.0 mg=10 ppm (0.23 ppm); 2.5 mg=25 ppm (0.59 ppm); 5.0 mg=50 ppm (1.17 ppm); 10.0 mg=100 ppm (2.34 ppm); 20.0 mg=200 ppm (4.68 ppm).

FIG. 50A—shows the antifungal effect of copper vermiculite. From left to right: upper: white bentonite, VV-CCE, VV-7; lower: kaolin, copper vermiculite, exfoliated copper vermiculite at initial time (o hour).

FIG. 50B—shows the antifungal effect of copper vermiculite. From left to right: upper: white bentonite, VV-CCE, VV-7; lower kaolin, copper vermiculite, exfoliated copper vermiculite incubated for 48 hours.

FIG. 50C—shows the antifungal effect of copper vermiculite. From left to right: upper: white bentonite, VV-CCE, VV-7; lower kaolin, copper vermiculite, exfoliated copper vermiculite incubated for 21 days.

FIG. 51—shows absorption mechanism between copper vermiculite particle and microbial cell.

FIG. 52—shows leaching rate of major metals in copper vermiculite in water solution.

FIG. 53—shows soaking rate of major metals in copper vermiculite in water solution FIG. 54—shows leaching rate of major metals in copper vermiculite in water solution FIG. 55—shows soaking rate of major metals in exfoliated copper vermiculite in water solution FIG. 56—shows leaching and soaking methods for determining release rate of copper. Cv—metal concentration in vermiculite; Cs—metal concentration in solution; CB—metal concentration at the edge of vermiculite particles.

FIG. 57—shows the comparison of release rates of copper ions from different samples. LMCV-leached solution of MCV; LMECV-leached solution of MECV; SMCV-soaked solution of MCV; SMECV-soaked solution of MECV.

DETAILED DESCRIPTION OF THE PREFERRED EMBODIMENTS

Vermiculite is a naturally occurring layer-structured mineral, which is composed of alterative aluminum silicate sheets and hydrate cation sheets. The aluminum silicate sheet of vermiculite is further made up of two silicon-oxygen octahedral layers and one aluminum-oxygen tetrahedral layer. Since the silicon ions in silicon-oxygen tetrahedral layer are often substituted by trivalent cations such as $Al^{3+}$, $Fe^{3+}$, and the aluminum ions in the aluminum-oxygen octahedral layer are substituted by bivalent cations such as $Mg^{2+}$, $Fe^{2+}$, $Ca^{2+}$, the aluminum silicate sheets of vermiculite thus are usually negatively charged. This requires extra cations in the interlayer regions to maintain chemical equilibrium. Naturally, the cations in the interlayer regions of vermiculite are generally magnesium ions (may contain few calcium or potassium, etc.), which hydrated and combined with the silicate sheet by water molecules. The cations in the interlayer region are exchangeable and can be easily replaced in the laboratory by cation exchange reaction. Vermiculite has excellent cation exchange capacity. Typically, bulk density of vermiculite is 800-1120 kg/m³ (50-70 lb/ft³). The cation exchange capacity of vermiculite concentrates reach 50-150 mmol/100 g, which depends on impurity of vermiculite and particle size.

Within the interlayer regions of vermiculite, water molecules will transform into steam when rapidly heated to high temperature (around 850° C. or higher). The pressure of the steam forces the silicate sheets apart from each other, causing the dramatic increase of volume of vermiculite particles (expansion, usually called exfoliation). Thermally exfoliated vermiculite has very unique properties, such as lightweight (low density), high porosity, specific surface area, high aspect ratio of laminates, and high cation exchange capacity. For example, the commercial products of exfoliated vermiculite of the Virginia Vermiculite LLC, Louisa, Va., "Milled No. 7" has a bulk density of 96-160 kg/m³ (6-10 lb/ft³), aspect ratio up to 20,000, and cation exchange capacity of 50-150 mmol/100 g.

Clay minerals have similar silicate sheets and exchangeable ions in the structures with vermiculite. However, vermiculite is significantly distinguished from clay minerals due to its high layer charge that results in a high cation exchange capacity, unique exfoliation function, special interlayer cations, and a larger particle size. It was therefore classified to different mineralogical groups by mineralogists.

Furthermore, exfoliated vermiculite has unique properties, such as lightweight, high porosity, and high cation exchange capacity.

It has been known that some transition metals exhibit antimicrobial activities. These metals include silver, copper, zinc, nickel, manganese, lead, cadmium, and cobalt, etc. Because of the toxicity of some of these metals to human and animals, and antimicrobial efficiency, only copper, silver, zinc, and manganese are suitable to be utilized in the products directly contacting with human and animals. Among these metals, silver and copper are the most effective elements. Other metals such as lead, arsenic, mercury, and cadmium also have strong antimicrobial properties, but are difficult to deploy safely.

Metallic ions on the surface of a product that are in contact with microorganisms disrupt the metabolism and replication functions of the cells, which inhibits the growth of microorganisms. In general, the antimicrobial mechanism of transition metals is believed to result from their strong ionic nature. Once the metallic ion of transition metals diffuse across the cell membrane of pathogenic microbes by various pathways, it inhibits the enzymatic activity by substituting native metal ions within an enzyme. The antimicrobial activity may be explained by one or more different mechanisms. Ionic metals have stronger antimicrobial efficiency than their pure bulk metals, alloys, or nano-scaled particles. Nano-scaled metallic particles usually consist of a metallic core which is surrounded by metal oxide. This affects the release of metallic ions, and increases product costs due to excessive metals added.

The current invention provides novel antimicrobial exfoliated vermiculite compound and corresponding synthetic production thereof. This antimicrobial compound is composed of exfoliated vermiculite and metal ions having antimicrobial property, which includes copper, silver, zinc, manganese, and nickel. The exfoliated vermiculite antimicrobial compound is prepared by implanting antimicrobial metallic ions into the structure of exfoliated vermiculite through cation exchange reactions and surface absorption. The target metals can be implanted into or absorbed on vermiculite particles by at least one or more of the following simplified reactions:

$$Cu^{2+} + M^{2+}\text{-vermiculite} \longrightarrow M^{2+} + Cu^{2+}\text{-vermiculite}$$

$$2Ag^{+} + M^{2+}\text{-vermiculite} \longrightarrow M^{2+} + 2Ag^{+}\text{-vermiculite}$$

$$Zn^{2+} + M^{2+}\text{-vermiculite} \longrightarrow M^{2+} + Zn^{2+}\text{-vermiculite}$$

$$Mn^{2+} + M^{2+}\text{-vermiculite} \longrightarrow M^{2+} + Mn^{2+}\text{-vermiculite}$$

$$Mn^{4+} + 2M^{2+}\text{-vermiculite} \longrightarrow 2M^{2+} + Mn^{2}\text{-vermiculite}$$

$$Ni^{2+} + M^{2+}\text{-vermiculite} \longrightarrow M^{2+} + Ni^{2+}\text{-vermiculite}$$

where M represents the exchangeable ions within the interlayer regions of exfoliated vermiculite. Usually, the exchangeable ions are magnesium ions even though the vermiculite from some ore deposits partially contain calcium and potassium. Therefore, copper is the best metal for making exfoliated vermiculite antimicrobial compound, since copper has same equivalent charge and the closest ionic radius with magnesium [the ionic radius of magnesium ($Mg^{2+}$) is 0.075 nm, copper ($Cu^{2+}$) is 0.072 nm]. However, when the single species of antimicrobial metals loaded in the exfoliated vermiculite is replaced by a combination of multiple elements, the exfoliated vermiculite can exhibit a broader antimicrobial spectrum, and a smaller amount of individual metal needed.

As used herein, an antimicrobial material herein refers to a material that has sufficient antimicrobial activity to have a beneficial effect. The antimicrobial activity of this invention includes antibacterial, antifungal, antialgal, antiviral, anti-biofilm, anti-inflammatory, bactericidal, fungicide, microbicide, germicide, bacteriostatic, fungistatic, decontamination, degerm, disinfectant, sanitize.

This invention features an exfoliated vermiculite that contains at least one of the individual metals, copper, silver, zinc, nickel, or manganese through a synthetic process.

The metal element implanted into vermiculite structure and surface can be individual or complex of two or more of these elements. These metal elements are ionic state in vermiculite, but can contain a part of nanometer particles of these metals. In some embodiments, this exfoliated vermiculite can include at most about 20% weight percent of the metal elements. In addition to one or more metal elements, such exfoliated vermiculite can contain metal oxides, metal hydroxides, metal nitrides, metal carbides, metal phosphates, metal silicates, metal borides, metal sulfides, metal halides, metal hydrides, metal nitrates, metal carbonates, metal sulfadiazines of these elements.

Generally, the method of making this said exfoliated vermiculite of the present invention is cation exchange process, which includes steps:

(1) Preparing the initial exfoliated vermiculite. The preferred grain size of exfoliated vermiculite is smaller than 75 microns.

(2) Preparing the metal solution, which contains 0.01-1.0M metals descried above (0.01-1.0 mole metal in a liter of water). The optimistic metal concentration is between 0.1-0.2M.

(3) Dissolving the initial exfoliated vermiculite into above metal solution in a desired ratio between approximately 1:5 and 1:100 [based on the ratio of grams of exfoliated vermiculite (in dry ingredient) vs. metal solution (ml)], depending on the specific metal to be solved and reaction conditions. The optimistic ratio is between approximate 1:10-1:30.

(4) Adjusting the pH value of the solution to 1-6 with acid and alkaline solutions.

(5) Heating above solution (suspension) to 40° C.-90° C. with a conventional heater, and maintaining the temperature for 1-8 hours, while continuously blending the solution with a common mechanic blender, magnetic stirrer, or by hand. This step can also been carried out at room temperature, while it last for over 4 hours.

(6) Filtering the suspension (slurry) after reaction with filter paper or a pressure filter.

Washing the residue with distilled water, and then dries the vermiculite cake in a drying processor such as furnace and oven at 100° C.-110° C. for at least 0.5 hours.

(7) Grinding the dried exfoliated vermiculite cake in a grinding processor such as mill into the form of powder.

This dried powder is said antimicrobial exfoliated vermiculite compound.

In present invention, exfoliated vermiculite is used as the carrier of the metals having antimicrobial property. The initial exfoliated vermiculite can be naturally commercial products of exfoliated vermiculite or ground products after exfoliation of vermiculite. The particle size can vary, depending upon the application requirement.

In step (2), the metals used should be one or more of following elements: copper, silver, zinc, nickel, or manganese. The metals can be obtained from any types of solvable metal oxides, metal hydroxides, metal sulfides, metal sulfates, metal chlorides, metal nitrates, metal carbonates, metal phosphates, metal hydrides, and metal sulfadiazines of these elements. It also can be waste water containing ions of these metals, such as copper mine drains, electrowinning wastewaters.

When silver was included in the metal solution, this making procedure should be taken in a dark room. Otherwise, all the containers to treat silver solution, suspension, and cake should be non-transparent or brown, and covered to prevent the affect of ultraviolent.

In step (3), the process should be carried out in a reactor. The reactor can be made from glass, ceramic, plastic, metals or alloy such as stainless steel.

In step (4), the pH value can be adjusted by general solution of chemical reagents, such as HCl and NaOH. The optimistic pH value for the reaction is 2.5-4.

In step (5), the optimistic reaction temperature is 55° C.-85° C. For example, 85° C.-90° C. for metal nitrates, 70° C.-80° C. for metal chloride, 90° C.-95° C. for metal carbonates. The optimistic reaction duration is 2-3 hours. This step can also been carried out at room temperature, while it last for over 4 hours.

In step (6), the drying process can be performed in any conventional furnace, oven, or spraying dryer having an inlet temperature of 190° C. and an outlet temperature of 105° C.

An alterative method to prepare exfoliated vermiculite is to carry out cation exchange reaction of vermiculite to obtain unexfoliated vermiculite containing desired metal(s), then fire unexfoliated vermiculite at certain temperature so that obtain exfoliated vermiculite antimicrobial additive. Generally, the method of making such exfoliated vermiculite includes steps:

(a) Preparation of initial vermiculite concentrate (unexfoliated). This vermiculite concentrate can be obtained from vermiculite producers in various specifications. It can be further processed to get desired particle size distribution of vermiculite.

(b) Preparation of metal solution, which contains 0.01-1.0M metals descried above (0.01-1.0 mole metal in a liter of water). The optimistic metal concentration is between 0.1-0.2M.

(c) Dissolving the initial vermiculite concentrate into above metal solution in a desired ratio between approximately 1:5 and 1:100 [based on the ratio of grams of vermiculite concentrate (in dry ingredient) vs. metal solution (ml)], depending on the specific metal to be solved and reaction conditions. The optimistic ratio is between approximate 1:10-1:25.

(d) Adjust the pH value of the solution to 1-6 with acid and alkaline solutions.

(e) Heating above solution (suspension) to 40° C.-90° C. with a conventional heater, and maintain the temperature for at least 0.5 hours, while continuously blending the solution with a common mechanic blender, magnetic stirrer, or by hand.

(f) Filter the suspension (slurry) after reaction with filter paper or pressure filter. Washing the residue with distilled water, and then dries the vermiculite cake to reduce the moisture to approximate 5-15 weight percent (prefer to 8-12 weight percent). Grind the cake into the form of powder or granules in a mill.

(g) Exfoliation of vermiculite powder or granule. Fire the vermiculite powder or granule at 850° C.-1000° C. in a furnace. This process can be carried out by any current industry process for exfoliation of vermiculite.

This powder is said antimicrobial exfoliated vermiculite compound.

In step (b), the metals used should be one or more of following elements: copper, silver, zinc, nickel, or manganese. The metals can be obtained from any types of solvable metal oxides, metal hydroxides, metal sulfides, metal sulfates, metal chlorides, metal nitrates, metal carbonates, metal phosphates, metal hydrides, and metal sulfadiazines of these elements. It also can be waste water containing ions of these metals, such as copper mine drains, electrowinning wastewaters.

When silver was included in the metal solution, this making procedure should be taken in a dark room. Otherwise, all the containers to treat silver solution, suspension, and cake should be non-transparent or brown, and covered to prevent the affect of ultraviolent.

In step (c), the process should be carried out in a reactor. The reactor can be made from glass, ceramic, plastic, metals or alloy such as stainless steel.

In step (d), the pH value can be adjusted by general solution of chemical reagents, such as HCl and NaOH. The optimistic pH value for the reaction is 2.5-4.

In step (e), the optimistic reaction temperature is 55° C.-95° C. For example, 85° C.-90° C. for metal nitrates, 70° C.-80° C. for metal chloride, 90° C.-95° C. for metal carbonates. The optimistic reaction duration is 2-3 hours.

In step (f), the drying process can be carried out by using a spray dryer, or by heating the vermiculite cake in a drying equipment such as furnace or oven at 100° C.-110° C. for at least 0.5 hours, and then use a mill to get the cake into the form of powder or granules. When spray drying process is employed, the vermiculite cake should be previously mixed deionized water and uniformly blended in a ratio of 1.0 gram vermiculite (in dry ingredient) vs. 0.5 gram water. The working temperature of the spray dryer can be approximately controlled at an inlet temperature of 190° C. and an outlet temperature of 105° C.

The following examples are illustrative of the present invention and are not intended to restrict the scope of the invention as set forth in the appended claims.

EXAMPLE 1

Prepared 0.1M copper solution by dissolving 25 grams of pentahydrated copper sulfate, $CuSO_4 \cdot 5H_2O$ into 1000 ml of deionized water. Weighed and placed 100 grams of dried exfoliated vermiculite (commercially product, "Milled No. 7", available from Virginia Vermiculite LLC, Louisa, Va.) into a 5 liter of stainless steel reactor, then poured 3000 ml 0.1M copper solution into the reactor, adjusted pH value of the solution to 3-4 with 1M NaOH solution and 10% HCl solution. Heated the solution and maintained the temperature at around 80° C. Gently blended the suspension for 2 hours for complete reaction. The suspension after reaction was filtered with filter paper or pressure filter. The residue was washed with distilled water, and then dried at 100° C. for 2 hours. The dried powder was said antimicrobial exfoliated vermiculite composite material.

By chemical analysis, this dried antimicrobial exfoliated vermiculite contains 3.6 weight percent of metal copper.

EXAMPLE 2

Prepared 0.2M silver solution by dissolving 34 grams of silver nitrate, $AgNO_3$ into 1000 ml of deionized water.

Weighed and placed 10 grams of dried exfoliated vermiculite (commercially product, "Milled No. 7", available from Virginia Vermiculite LLC, Louisa, Va.) into a 500 ml brown glass flask, then poured 250 ml 0.2M silver solution into a chemical reactor, placed a magnetic stirrer which 0.5 inches in length and covered with Teflon, adjusted pH value of the suspension to 3-4 with 10% HCl solution. Put the suspension onto a hotplate, heated the suspension and maintained the temperature at around 85° C. Blended the suspension with the magnetic stirrer for 2 hours for complete reaction. The suspension after reaction was filtered with filter paper. The residue was washed with deionized water, and then dried at 100° C. for 2 hours. The dried powder was said antimicrobial exfoliated vermiculite composite material.

This procedure was completed in a dark room. All the containers to treat silver solution, suspension, and cake were non-transparent and covered to prevent the affect of ultraviolent.

By chemical analysis, this dried antimicrobial exfoliated vermiculite contains 6.2 weight percent of metal silver.

EXAMPLE 3

0.1M copper solution was prepared by dissolving 14 grams of copper chloride, $CuCl_2$ into 1000 ml of deionized water. Weighed and placed 50 grams of exfoliated vermiculite (commercially product, "Milled No. 7", from Virginia Vermiculite LLC, Louisa, Va.) into a 3 liter of stainless steel reactor, then poured 1500 ml 0.1M copper solution into the reactor, adjusted pH value of the solution to 3-4 with 1M NaOH solution and 10% HCl solution. Gently blended the suspension for 8 hours for complete reaction. Filtered the suspension with filter paper. The residue was washed with distilled water, and then dried at 100° C. for 2 hours.

The dried powder was said antimicrobial exfoliated vermiculite composite material. According to chemical analysis, this dried antimicrobial exfoliated vermiculite contents 3.2 weight percent of metal copper.

EXAMPLE 4

Exfoliated vermiculite (commercially product of Virginia Vermiculite LLC, Louisa, Va., "Milled No. 7") were ground into micron-sized powder through a jet mill. This process provided micron-sized exfoliated vermiculite. All the particles in this powder were less than 10 microns.

Prepared 0.1M copper solution by dissolving 24 grams of trihydrated copper nitrate, $Cu(NO_3)_2 \cdot 3H_2O$ into 1000 ml of deionized water. Weighed and placed 100 grams of dried micron-sized exfoliated vermiculite into a 5 liter of stainless steel reactor, then poured 3000 ml 0.1M copper solution into the reactor, adjusted pH value of the solution to 3-4 with 1M NaOH solution and 10% HCl solution. Heated the solution and maintained the temperature at around 85° C. The suspension was gently blended for 2 hours for complete reaction. The suspension after reaction was filtered with a pressure filter. The residue was washed with distilled water, and then dried at 100° C. for 2 hours.

The dried powder was said antimicrobial exfoliated vermiculite composite material. By chemical analysis, this dried antimicrobial exfoliated vermiculite contents 3.5 weight percent of metal copper.

EXAMPLE 5

Exfoliated vermiculite (commercially product of Virginia Vermiculite LLC, Louisa, Va., "Milled No. 7") were ground into down 325 meshes (45 microns) via a ball mill. This process provided fine exfoliated vermiculite powder. All the particles in this powder were less than 45 microns.

The following ingredients were combined and mixed together to form a substantially homogeneous multi-metal solution, which contains ions of 0.05M copper, 0.04M silver, 0.04M Zinc and 0.01M Manganese:
$CuSO_4 \cdot 5H_2O$, chemical reagent, 13 grams
AgNO3, chemical reagent, 7 grams
$ZnSO_4 \cdot 7H_2O$, chemical reagent, 12 grams
$MnSO_4 \cdot H_2O$, chemical reagent, 1.7 grams In a traditional dark room without ultraviolent, mixed and placed above compound in a 2000 ml glass flask, brought to 1000 ml with deionized water to form multi-metal solution. Weighed and placed 100 grams of dried fine exfoliated vermiculite into a 5 liter of conventional stainless steel reactor with electricity heater, then poured 3000 ml multi-metal solution into the reactor, adjusted pH value of the solution to 3-4 with 10% HCl solution. Heated the suspension and maintained the temperature at approximate 85° C. The suspension was gently blended for 2 hours while being heating. The suspension after reaction was filtered with a pressure filter. The residual wetcake was washed with distilled water, and then dried at 100° C. for 2 hours.

The dried powder was said antimicrobial multi-metal exfoliated vermiculite composite material. According to chemical analysis, this dried multi-metal exfoliated vermiculite contains metals in weight percent: Ag 1.1, Cu 2.6, Zn 0.8, and Mn 0.3.

EXAMPLE 6

Taken 1.0 lbs of exfoliated vermiculite (commercially product of Virginia Vermiculite LLC, Louisa, Va., "Milled No. 7") into a 2 gallon stainless steel reactor, then poured 5000 ml copper mining draining into the reactor, adjusted pH value of the solution to 3 with 10% HCl solution. The suspension was blended with a stainless blender at room temperature for 24 hours. The suspension after reaction was filtered with a pressure filter. The residual wetcake was washed with distilled water, and then dissolved to form a slurry with 200 ml additional water. The slurry was then spray dried in a conventional spray dryer equipped with a single fluid nozzle and having an inlet temperature of 190° C. and an outlet temperature of 105° C. The resulting granular product was dry and has an average particle size of approximately 200 microns.

The resulting granular product was said antimicrobial exfoliated vermiculite composite material. This dried exfoliated vermiculite contains 1.3 weight percent of metal copper.

EXAMPLE 7

The following ingredients were combined and mixed together to form a substantially homogeneous multi-metal solution, which contains ions of 0.1M copper and 0.04M silver:
$Cu(NO_3)_2 \cdot 3H_2O$, 24 grams
$AgNO_3$, 7 grams In a traditional dark room without ultraviolent, mixed and placed above compound in a 2000 ml glass flask, brought to 1000 ml with deionized water to form multi-metal solution. Weighed and placed 10 grams of dried exfoliated vermiculite (commercially product of Virginia Vermiculite LLC, Louisa, Va., "Milled No. 7") into a 500 ml glass flask, then poured 300 ml multi-metal solution into the reactor, adjusted pH value of the solution to 3.5 with 10% HCl solution. Heated the suspension on a conventional hotplate and maintained the temperature at approximate 85° C. The suspension was gently blended for 1.5 hours while being heating. The suspension after reaction was filtered with filter paper. The residual wet cake was washed with distilled water, and then dried at 100° C. for 2 hours.

The resulting dried powder was said antimicrobial multi-metal exfoliated vermiculite composite material. According to chemical analysis, this dried multi-metal exfoliated vermiculite contains metals in weight percent: Ag 1.2, Cu 2.9.

EXAMPLE 8

Prepared 0.12M copper solution in a 2000 ml glass flask by dissolving 30 grams of pentahydrated copper sulfate, $CuSO_4 \cdot 5H_2O$ into 1000 ml of deionized water. Weighed and placed 100 grams of vermiculite concentrate (commercially product of the Paladora America Ltd., Kennesaw, Ga., USA. "Grade Fine", which has particle size of 0.7-2.0 mm, bulk density of 850-1050 kg/m3) into a 1 gallon glass reactor, then poured 2000 ml of 0.12M copper solution into the reactor, adjusted pH value of the suspension to around 3.5 with 1M NaOH solution and 10% HCl solution. Put the suspension with reactor onto a conventional hotplate, heated the suspension and maintained the temperature at 83° C. for 3.5 hours. Gently blended the suspension with a stainless steel blender during the heating for complete reaction. The suspension after reaction was filtered with a pressure filter with filter paper. The residual wetcake was washed with deionized water, and then dried at 100° C. in an electricity oven for 2 hours to reduce the moisture to approximate 10 weight percent. The dried cake was milled into the form of powder. Placed the dried vermiculite powder with a stainless steel trap in an electricity furnace (previously heated to 900° C.) for exfoliation, and kept for 20 seconds, then took off the vermiculite powder to cool to room temperature.

This fired powder was this said antimicrobial exfoliated vermiculite composite material. This fired powder can also be milled into various specifications of particle size distribution, depending onto the application demands. By chemical analysis, this exfoliated vermiculite contains 4.2 wt % metallic copper.

Research Study Results

The advantages of antimicrobial exfoliated copper vermiculite over antimicrobial unexfoliated copper vermiculite is strongly supported by the results of a research study by the inventors. The most relevant figures from the study comprise the figures in this application and are for illustration purposes only and should not be construed as a limitation on the scope of the present invention.

FIG. 1 shows a sketch of cross sections of unexfoliated vermiculite (left) and exfoliated vermiculite (right). The lines represent aluminum silicate sheets while the dots represent copper cations.

Unexfoliated vermiculite consists of infinitely alterative cell units, each cell made up of an aluminum silicate layer (sheet) and an interlayer region containing hydrated copper cations. During synthetic reaction, copper ions replaced magnesium in the interlayer regions to form copper vermiculite.

Exfoliated vermiculite has macro-interlayer regions resulting from the blasting off of the interlayer water molecules during exfoliation. Most of the aluminum silicate sheets were distorted and moved away from each other. The result is a product with high porosity and high specific surface area, thus providing high absorption of copper and other metals. During the cation exchange reaction, some copper ions substituted magnesium ions into the interlayer regions, while a major part of copper ions were absorbed on the surface of aluminum silicate sheets. This greatly improved the cation exchange capacity of exfoliated vermiculite as well as the release speed of copper from the vermiculite carrier.

On the other hand, the interlayer region of unexfoliated vermiculite can only be implanted by ionic copper. Nanometer copper particles remain on the surface of the silicate sheets. Because of this, exfoliated vermiculite can contain more metal nanometer particles.

Figure 1:
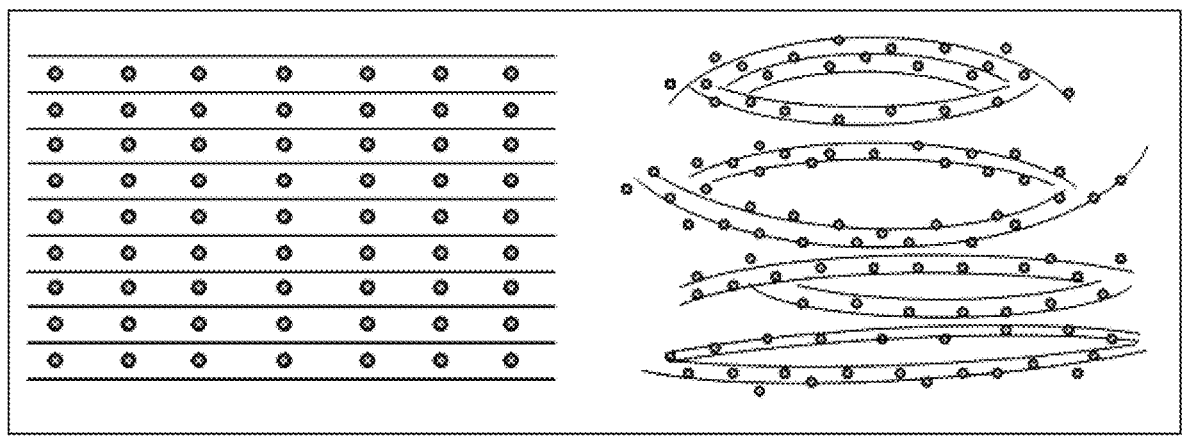
Figure 2:
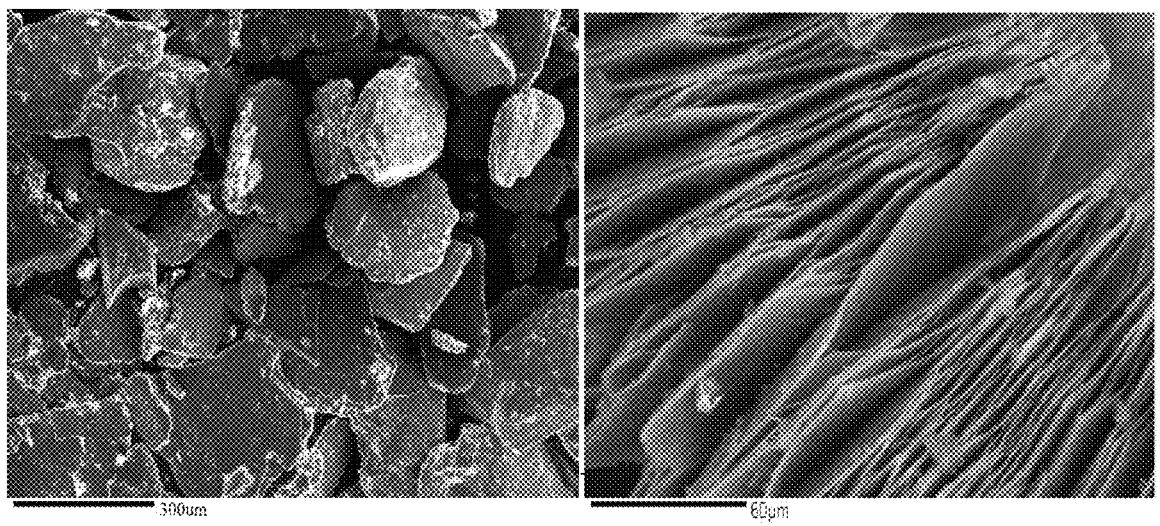
FIG. 2 shows Scanning Electron Microscopy (SEM) images of laminates of unexfoliated (left) and a grain of exfoliated vermiculite (right). Exfoliation exploded the laminate sheets splitting them into thin layers.
Figure 3:
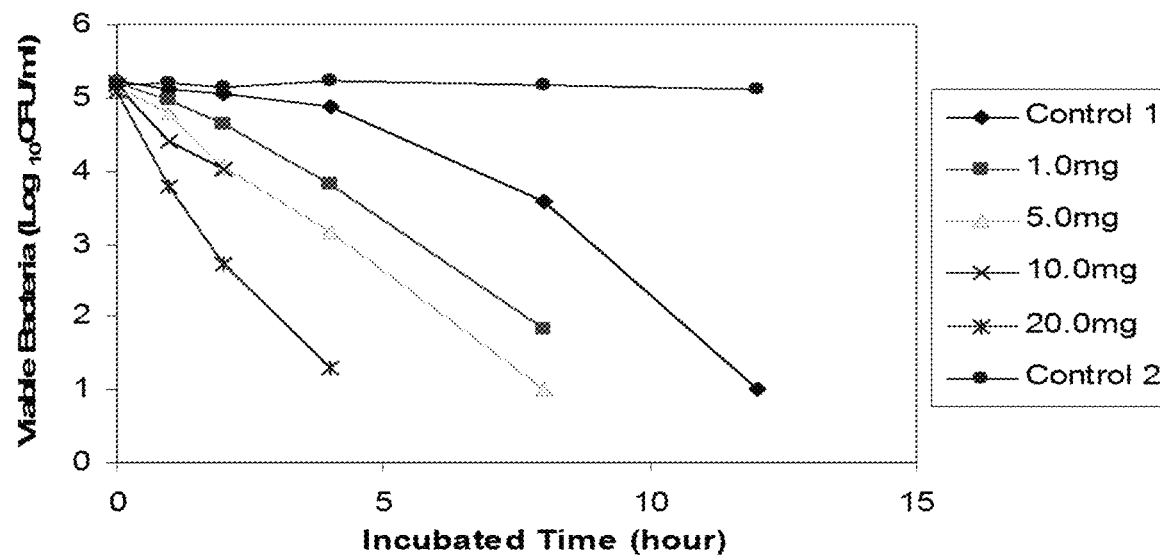
FIG. 3 shows the bactericide activity of unexfoliated vermiculite. With 20.0 mg copper vermiculite in 100.0 ml bacteria dilution (containing 200 ppm copper vermiculite, or 5.10 ppm of copper atoms), the reductions of viable bacteria are 94.8% at 1 hour, 99.6% at 2 hours, and >99.9% at 4 hours.
Figure 4:
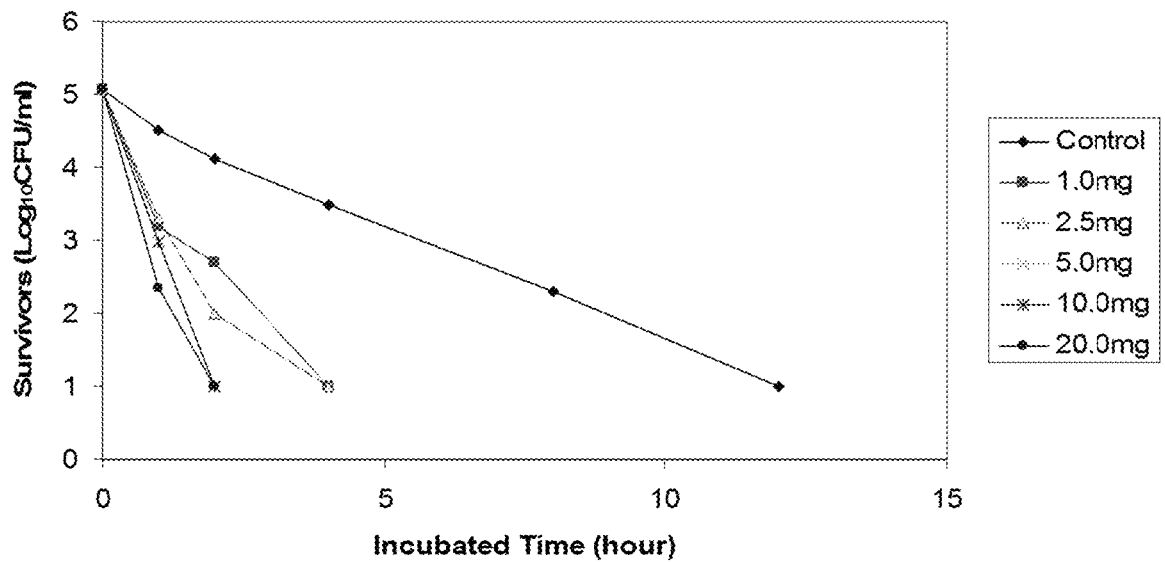

FIG. 4 shows the bactericide activity of exfoliated vermiculite. With 20.0 mg exfoliated copper vermiculite in 100.0 ml bacteria dilution (containing 200 ppm copper vermiculite, or 4.68 ppm of copper atoms), the reduction of viable bacteria are 99.8% at 1 hour and >99.9% at 2 hours. With 1.0 mg exfoliated copper vermiculite in 100.0 ml bacteria dilution (containing 10 pp. copper vermiculite, or 0.234 ppm of copper atoms), the reduction of viable *E. coli* reached 98.7% at 1 hour and .95.6% at 2 hours.

Figure 5:
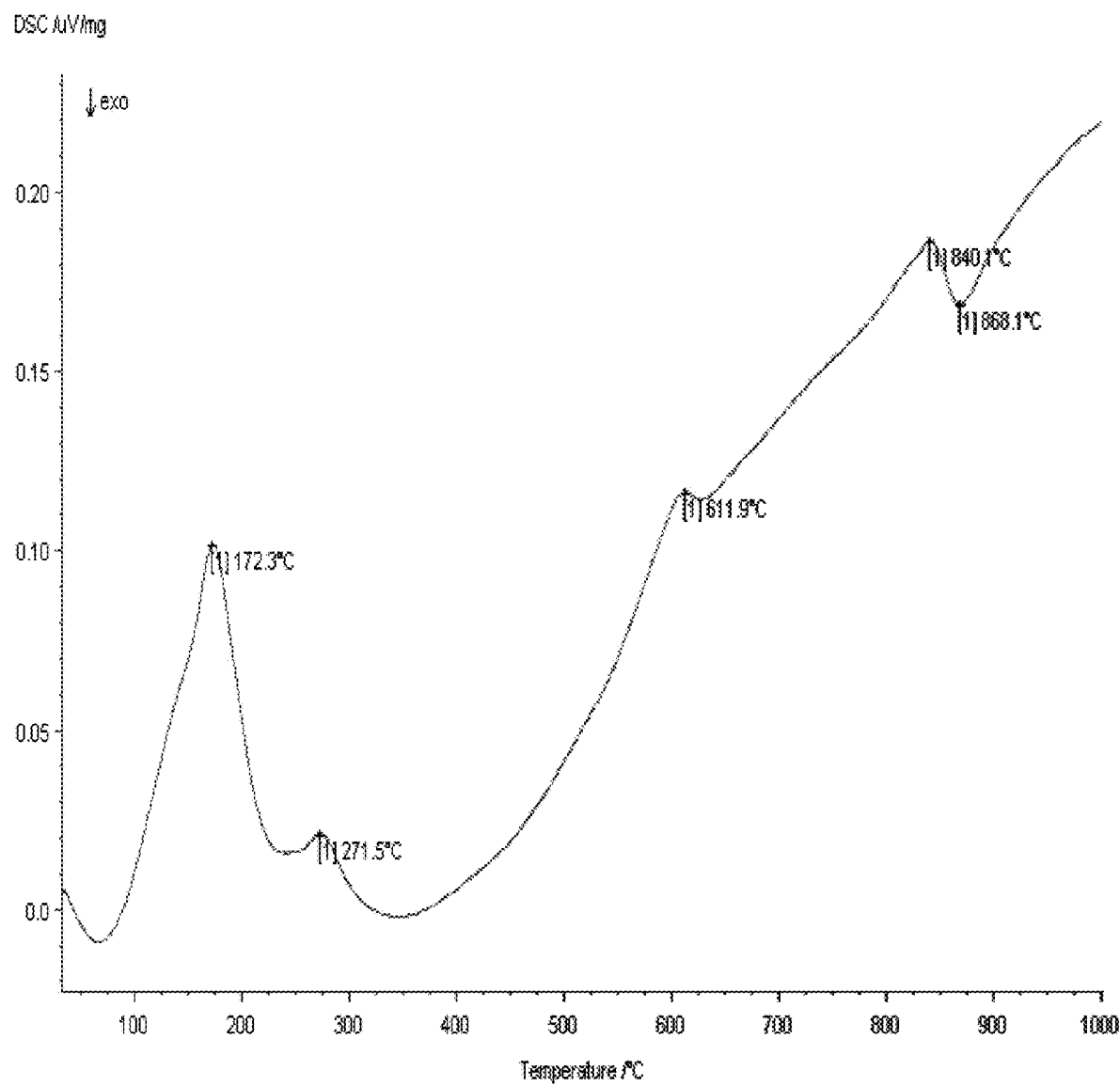

FIG. 5 shows a differential thermal analysis of unexfoliated vermiculite. Unexfoliated vermiculite contains interlayer water molecules. Once the temperature is elevated, it will absorb heat for its early dehydration and phase transformation at 173° C.

Figure 6:
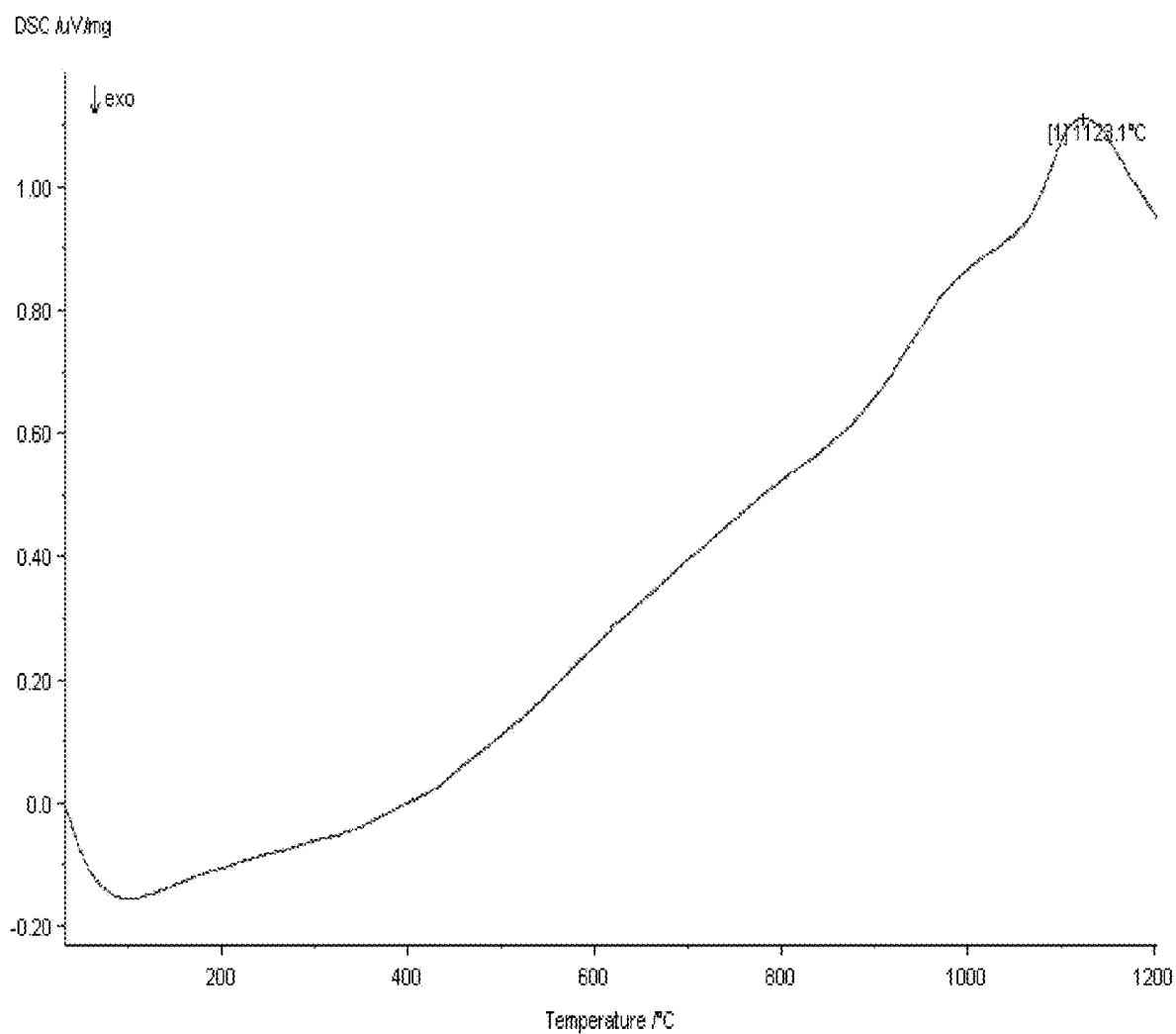
Figure 7:
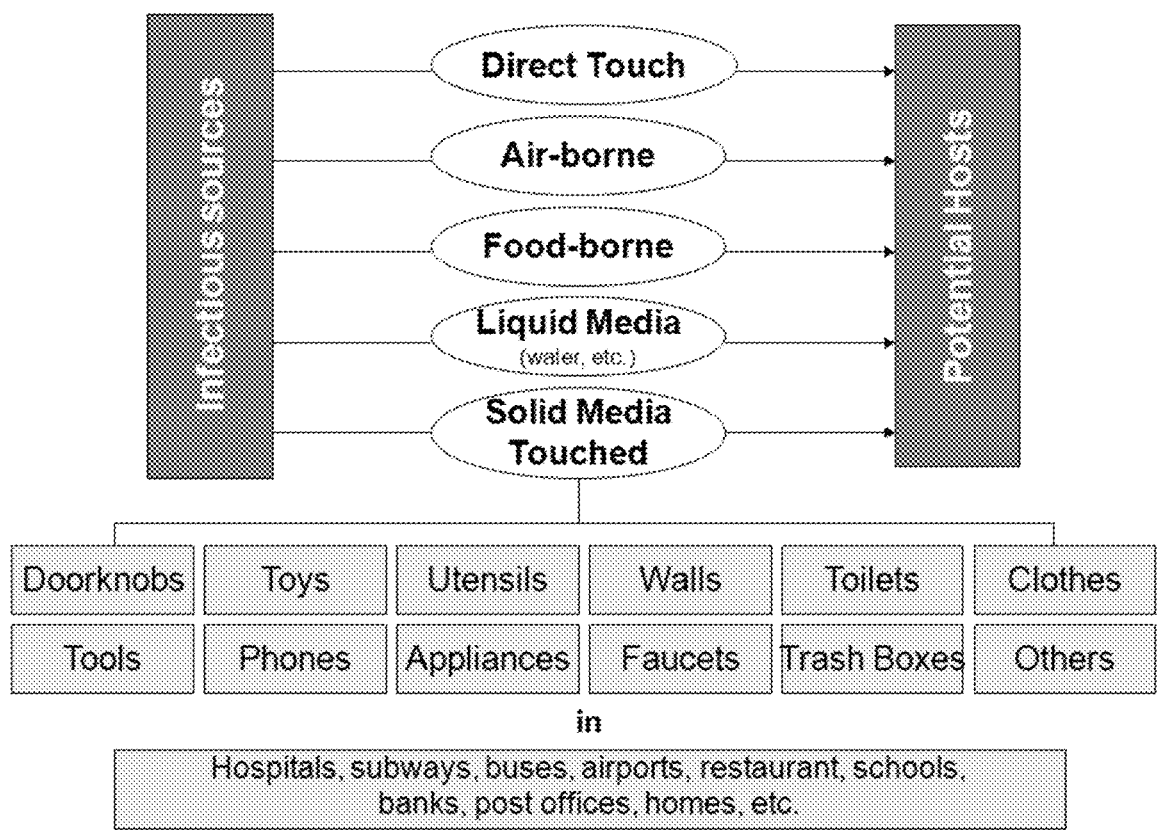
Figure 8:
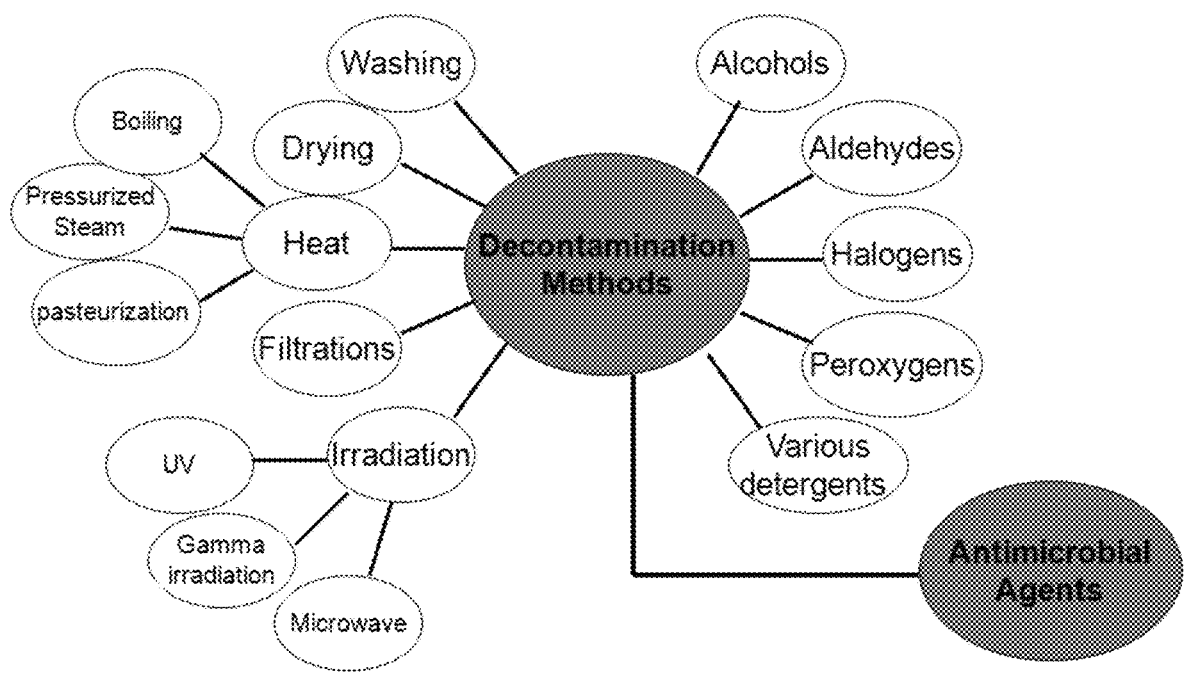
Figure 9:
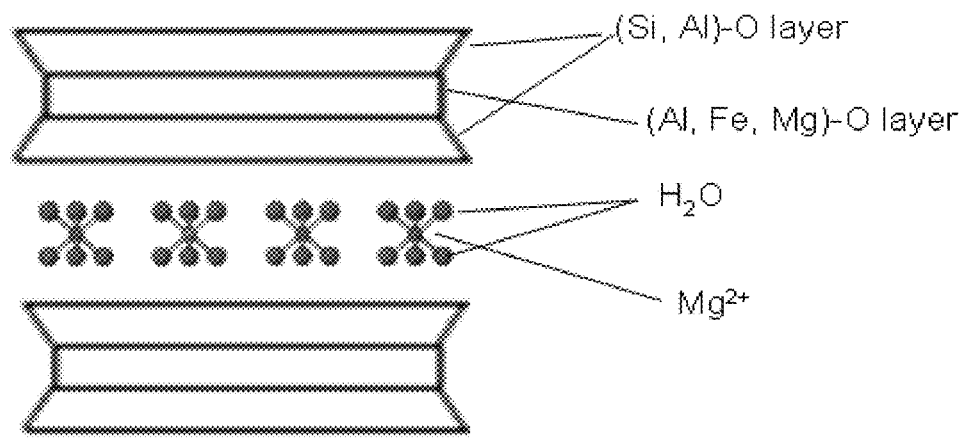
Figure 10:
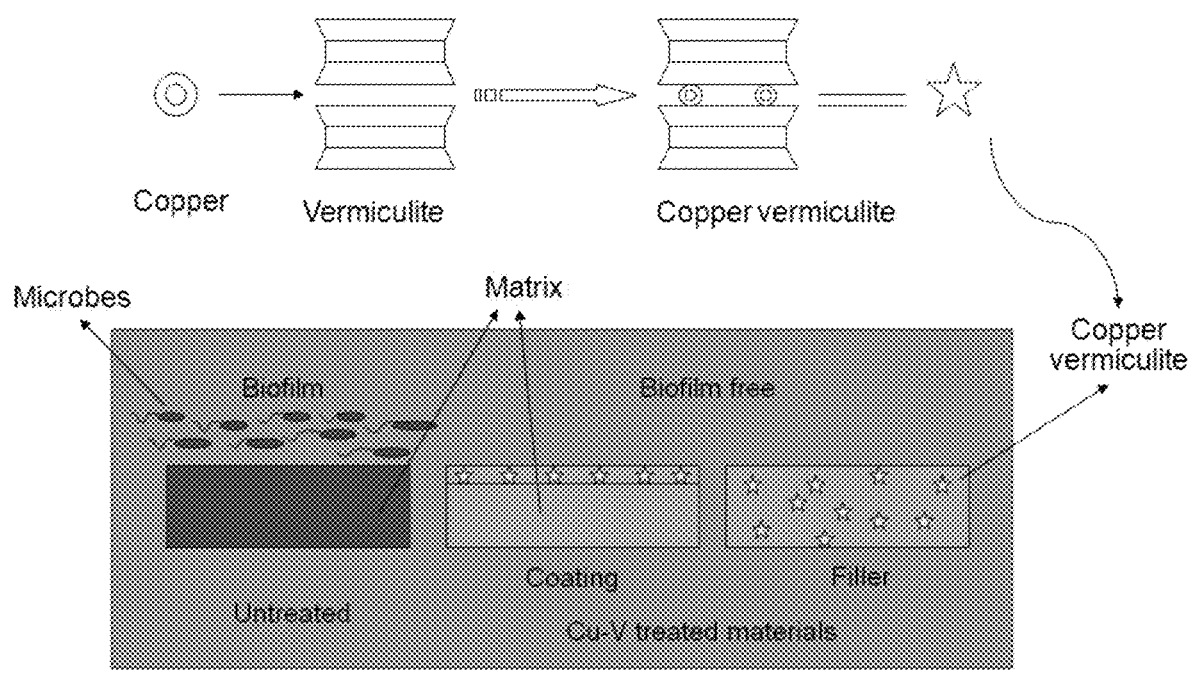
Figure 11:
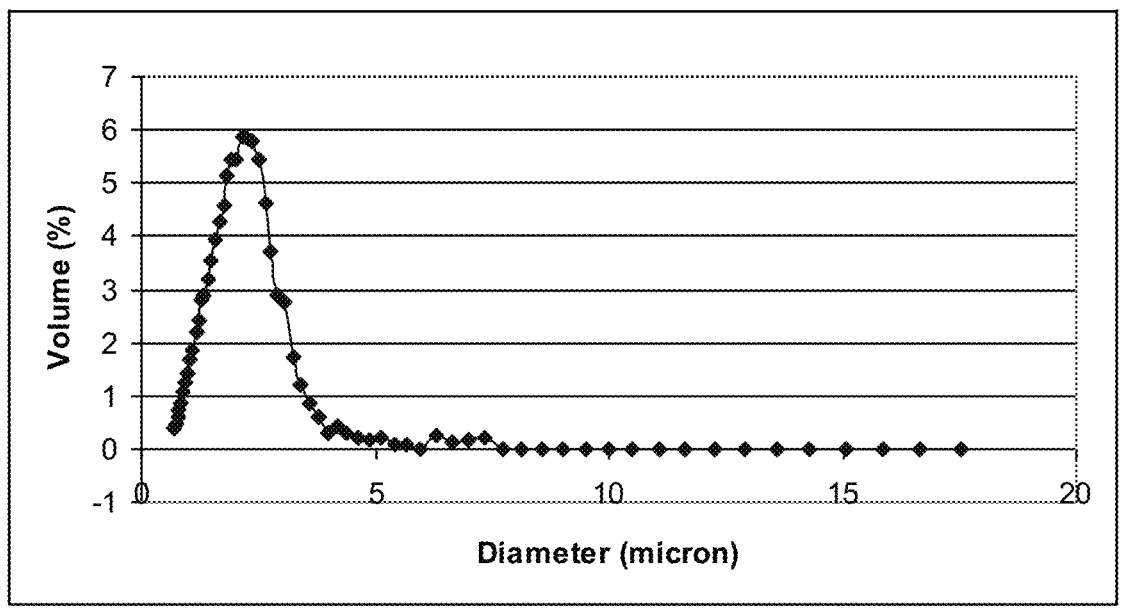
Figure 12A:
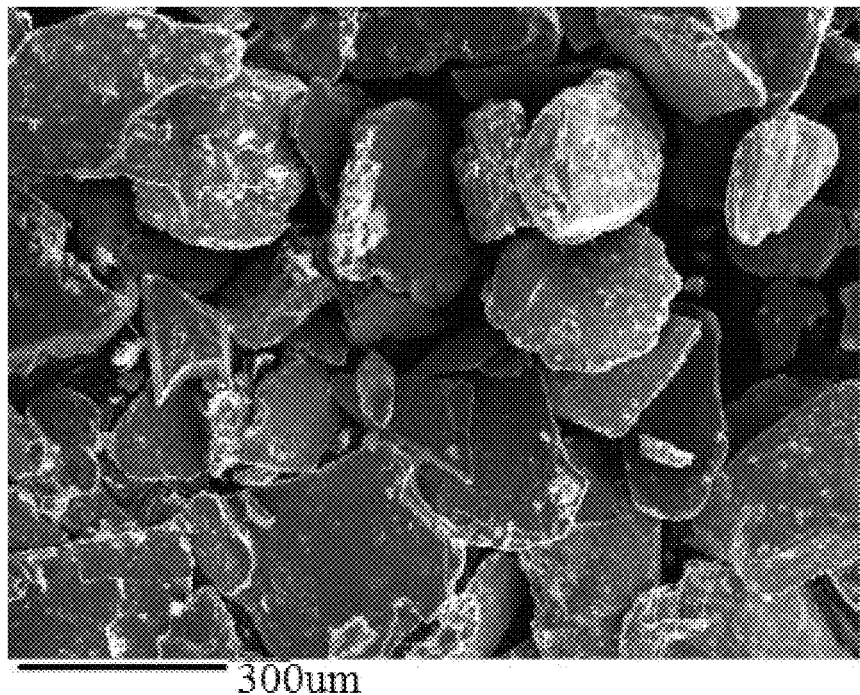
Figure 12B:
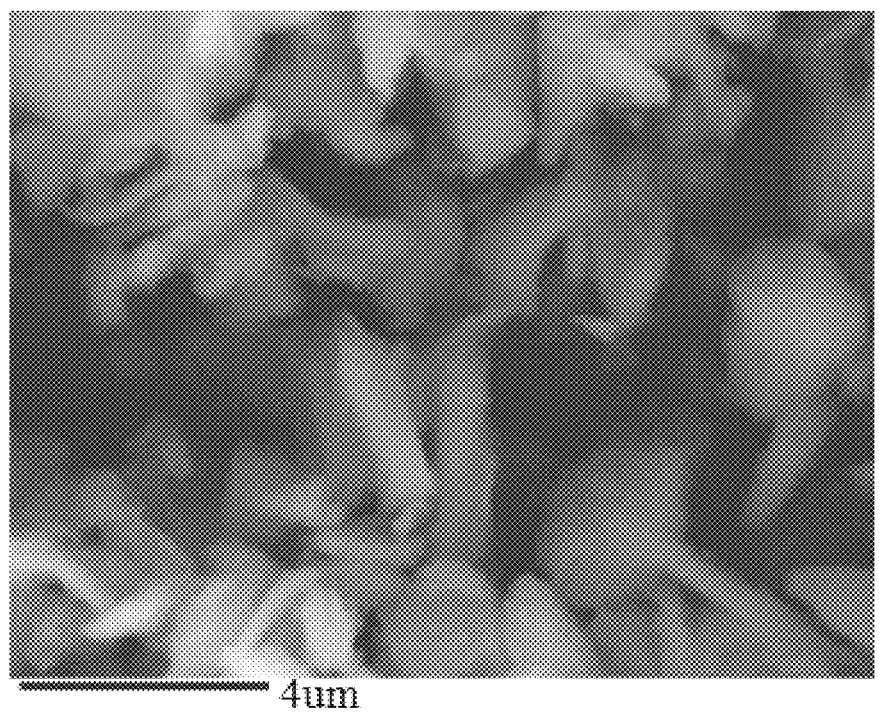
Figure 12C:
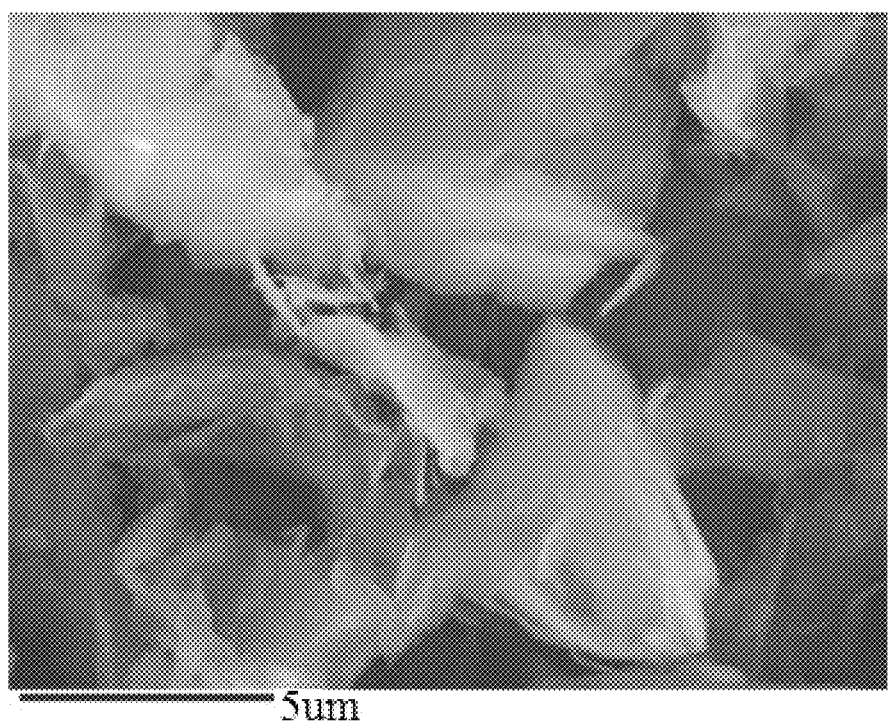
Figure 13:
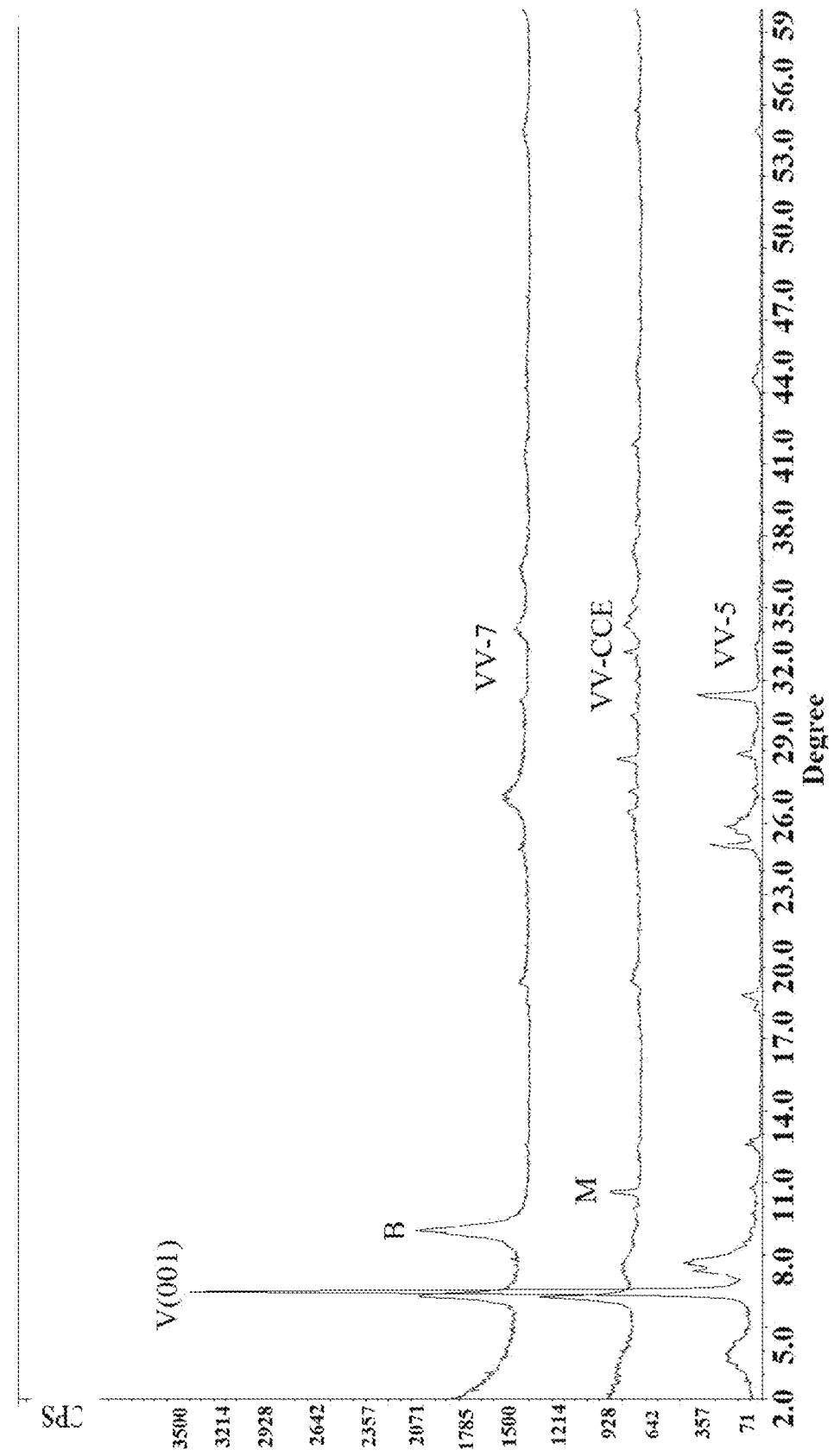
Figure 14:
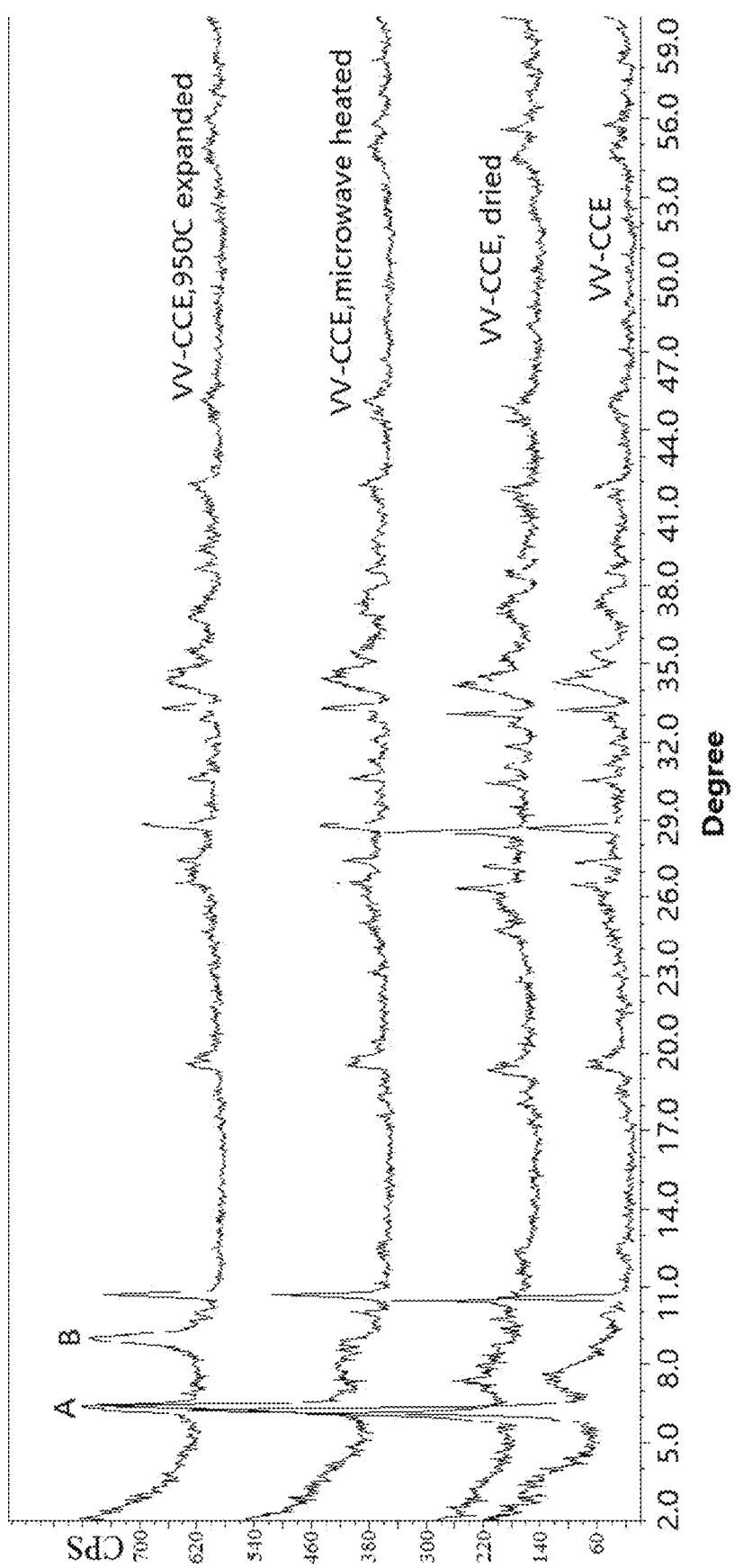
Figure 15:
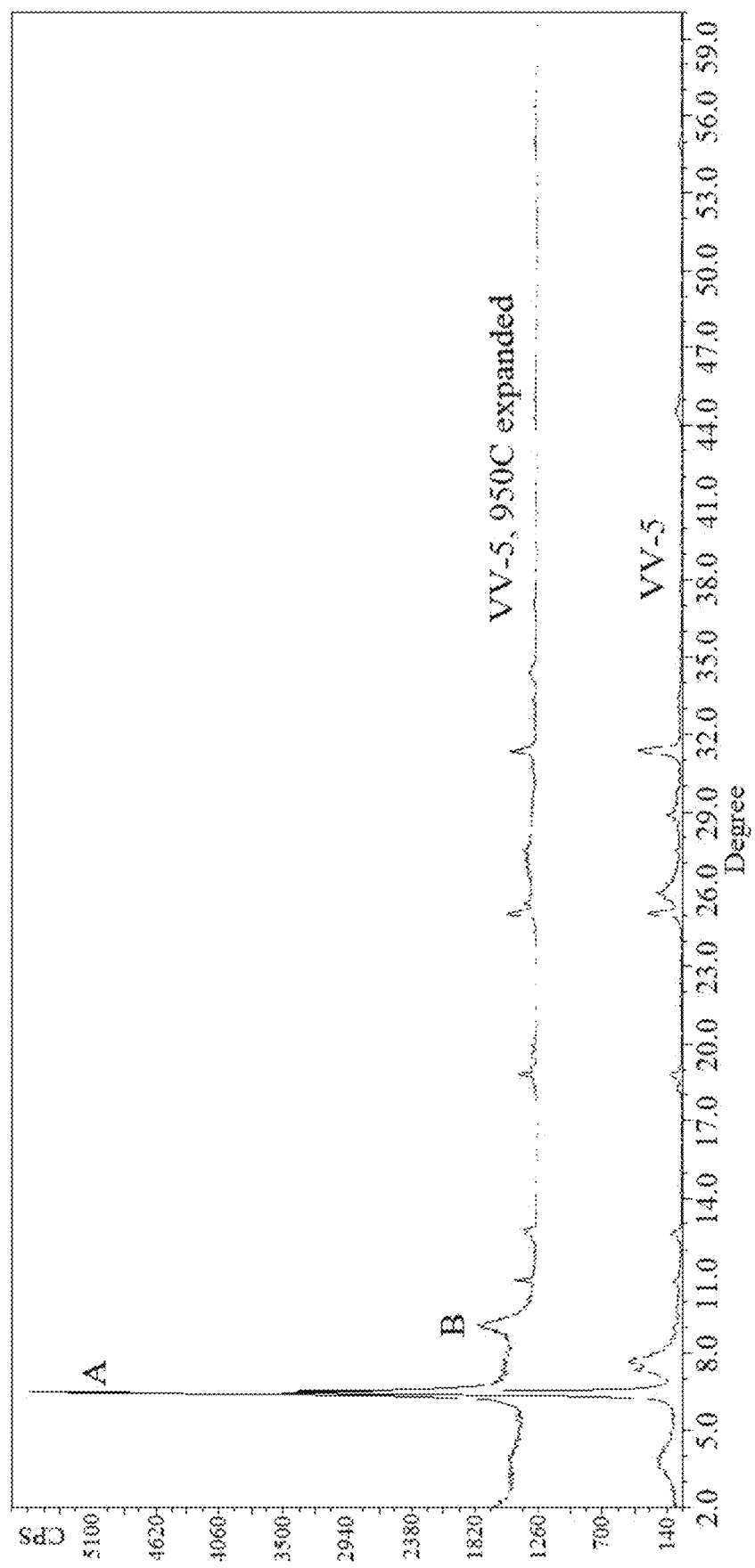
Figure 16:
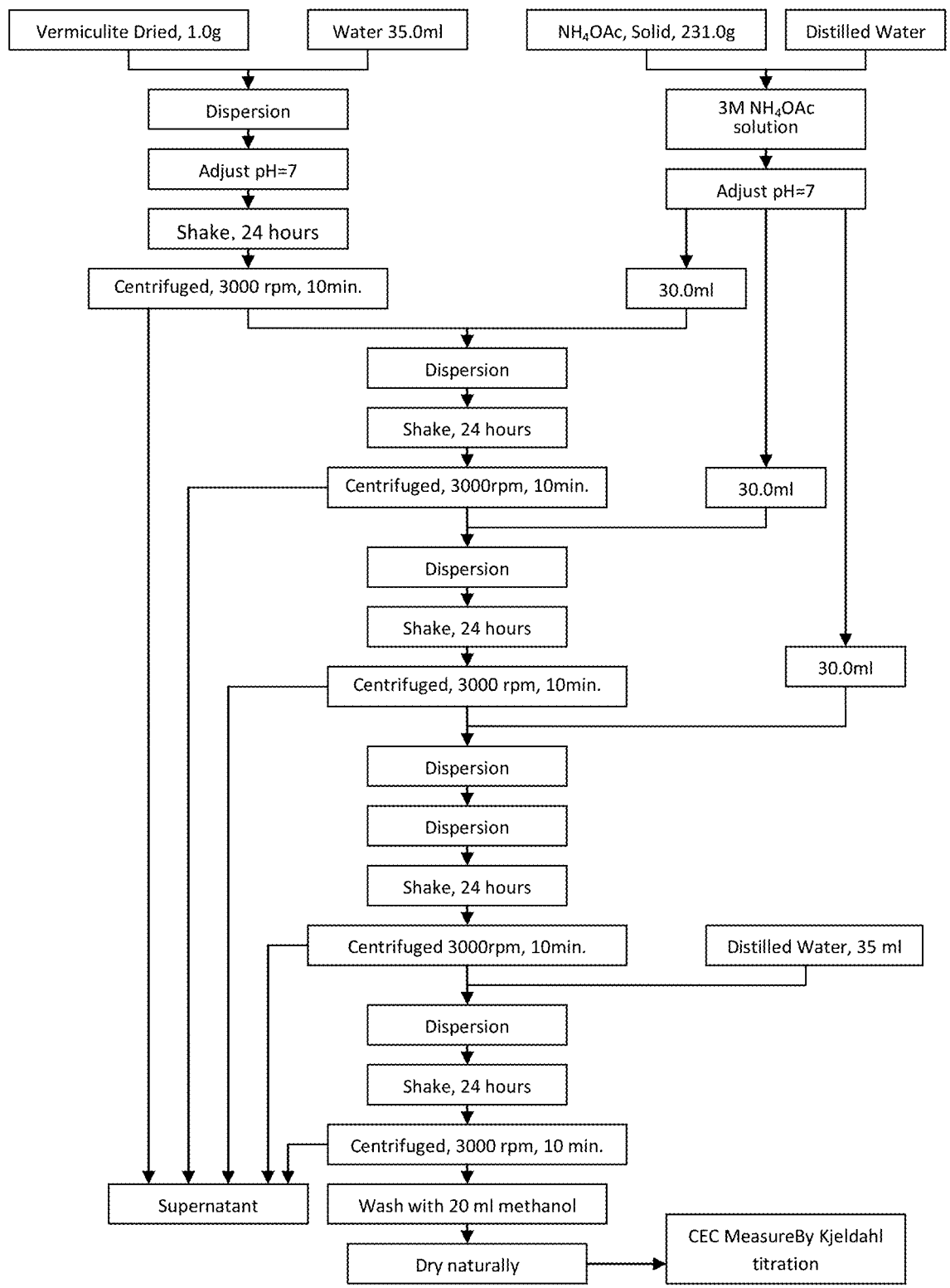
Figure 17:
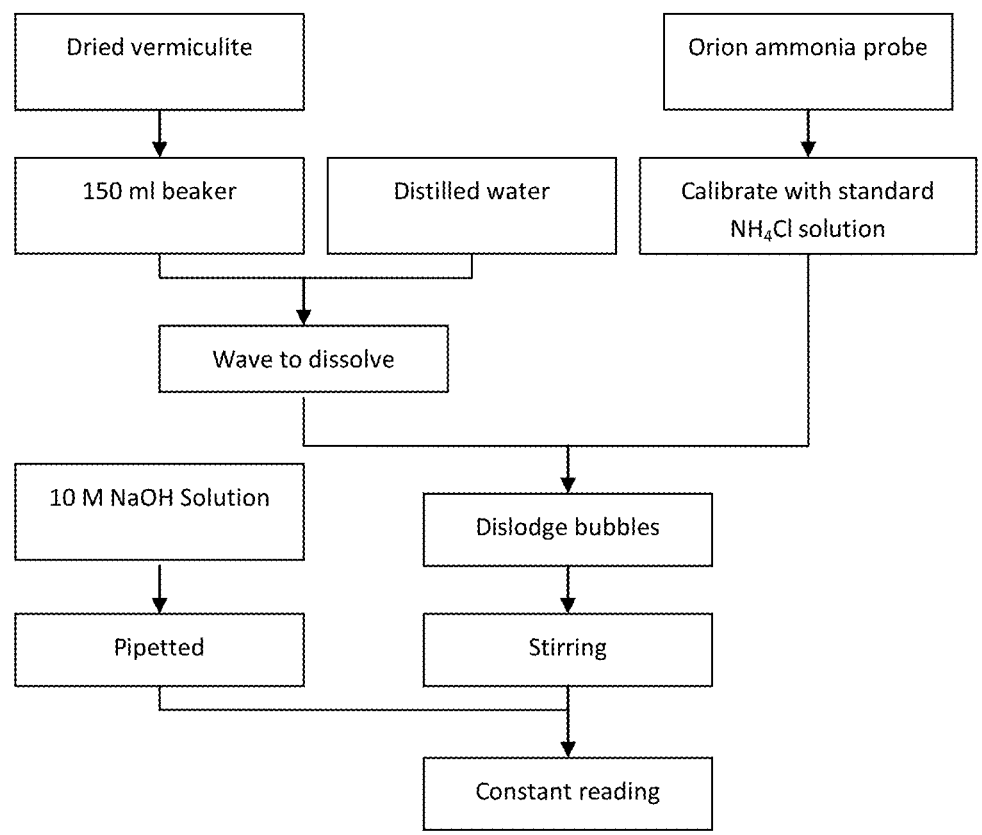
Figure 18:
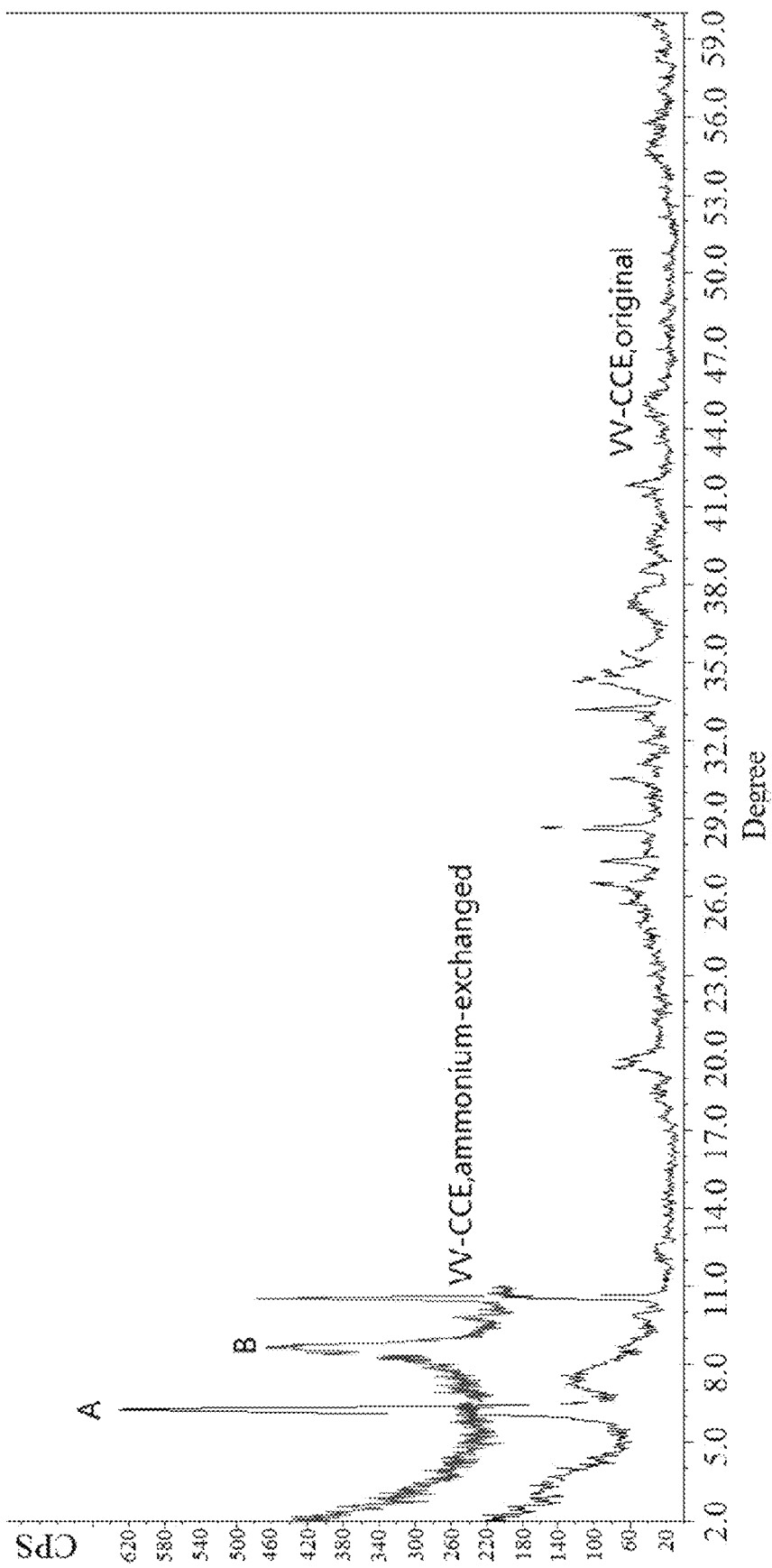
Figure 19:
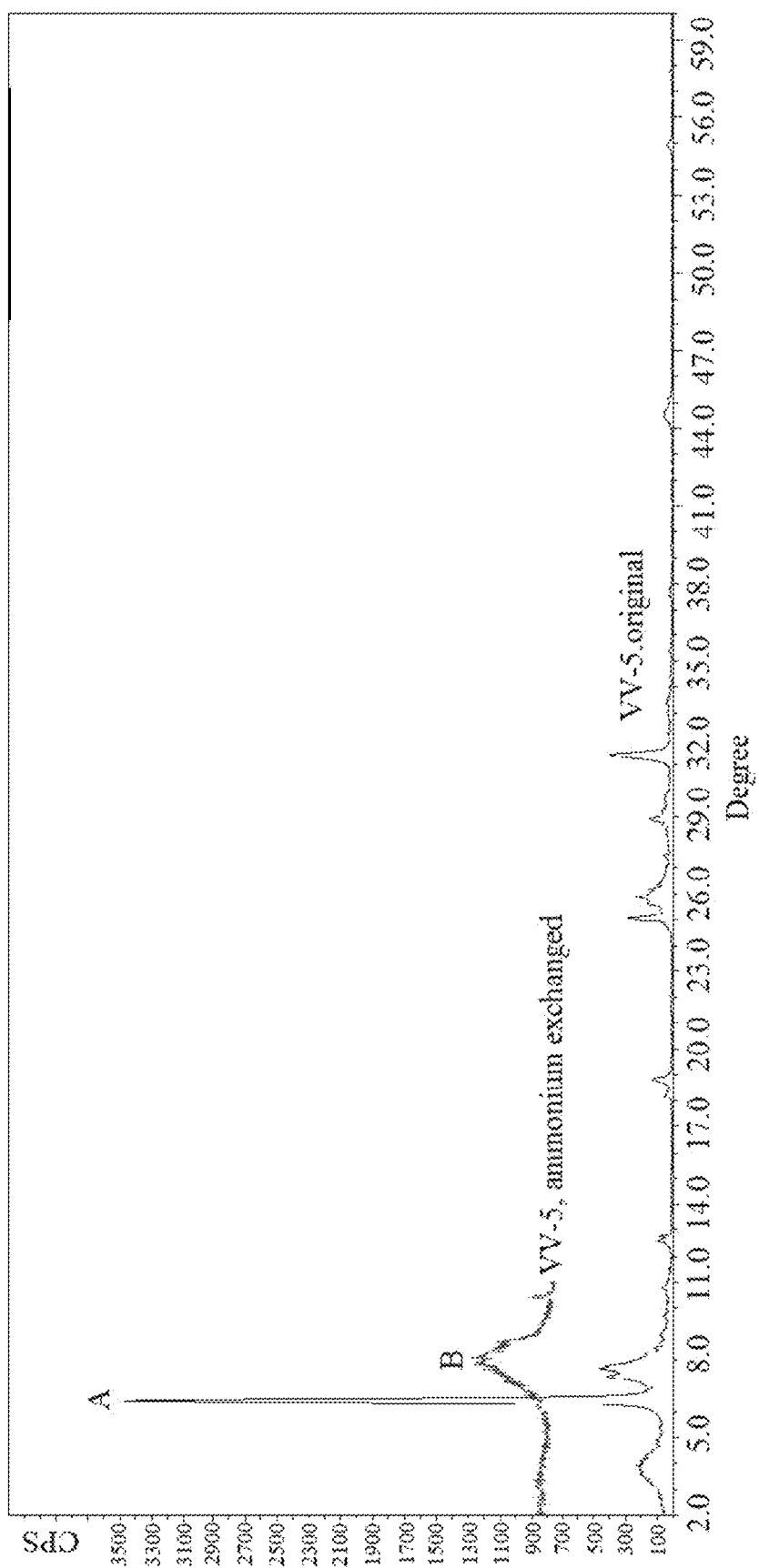
Figure 20:
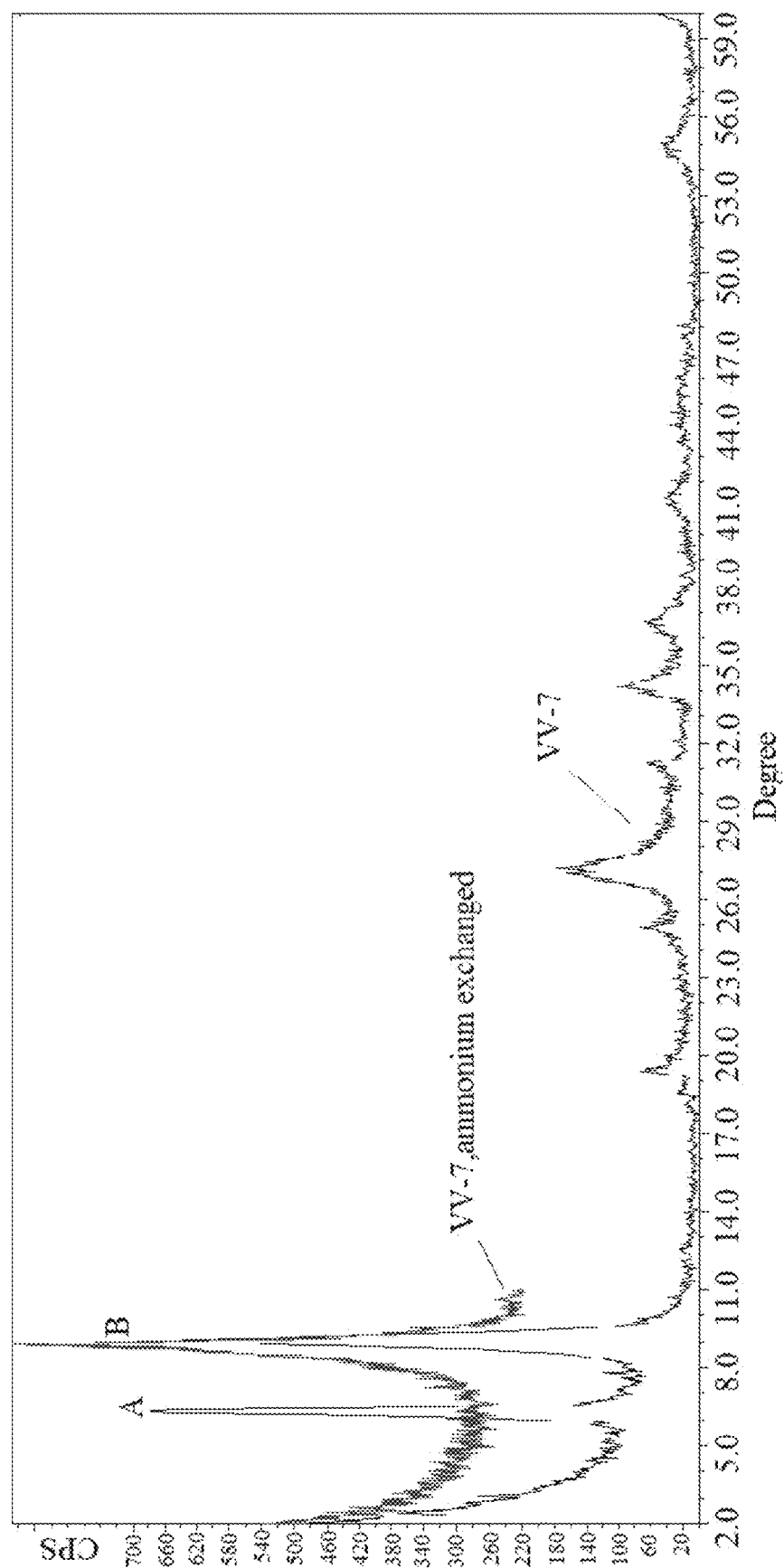
Figure 21B:
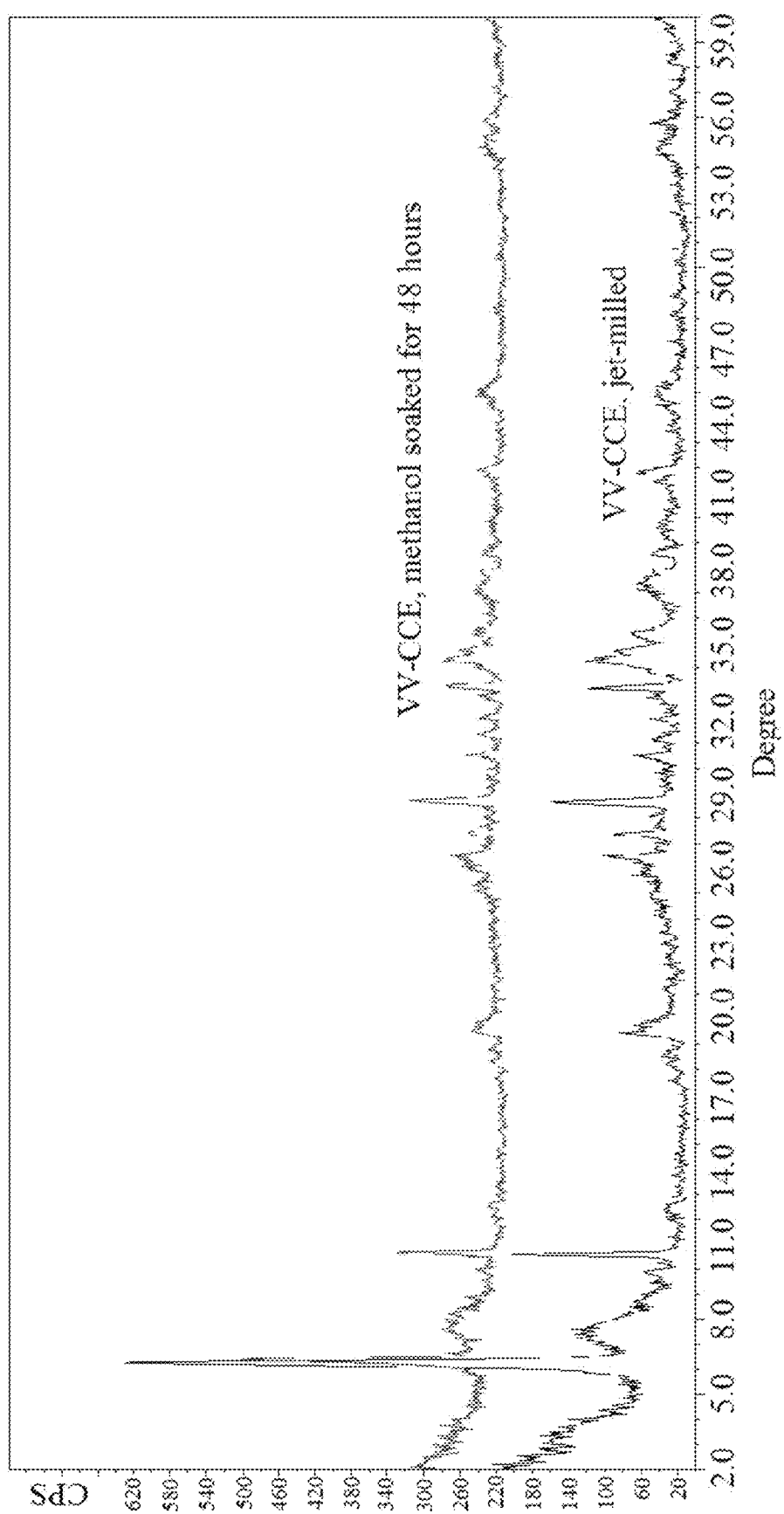
Figure 22A:
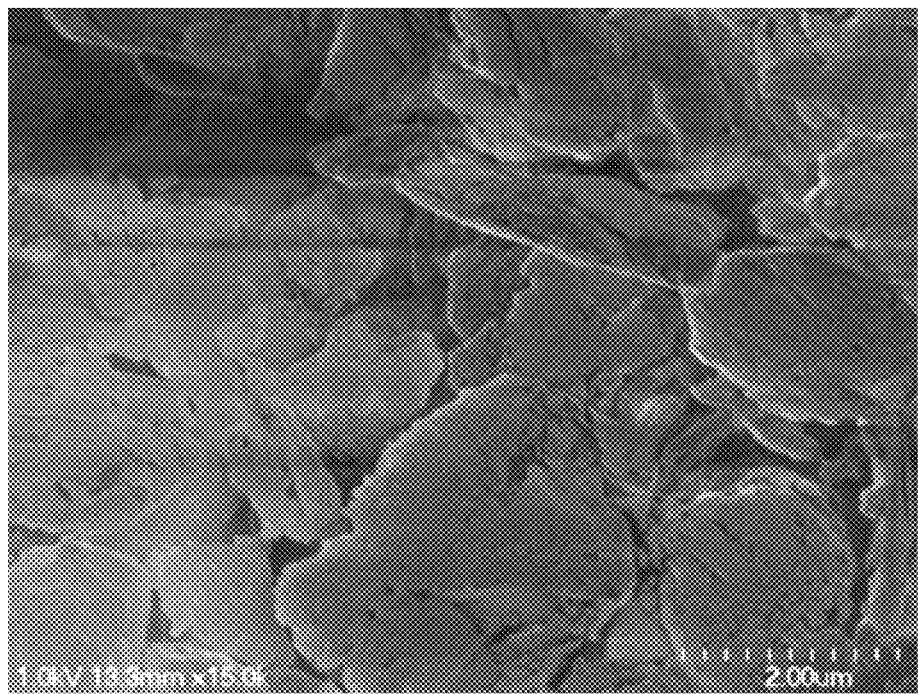
Figure 22B:
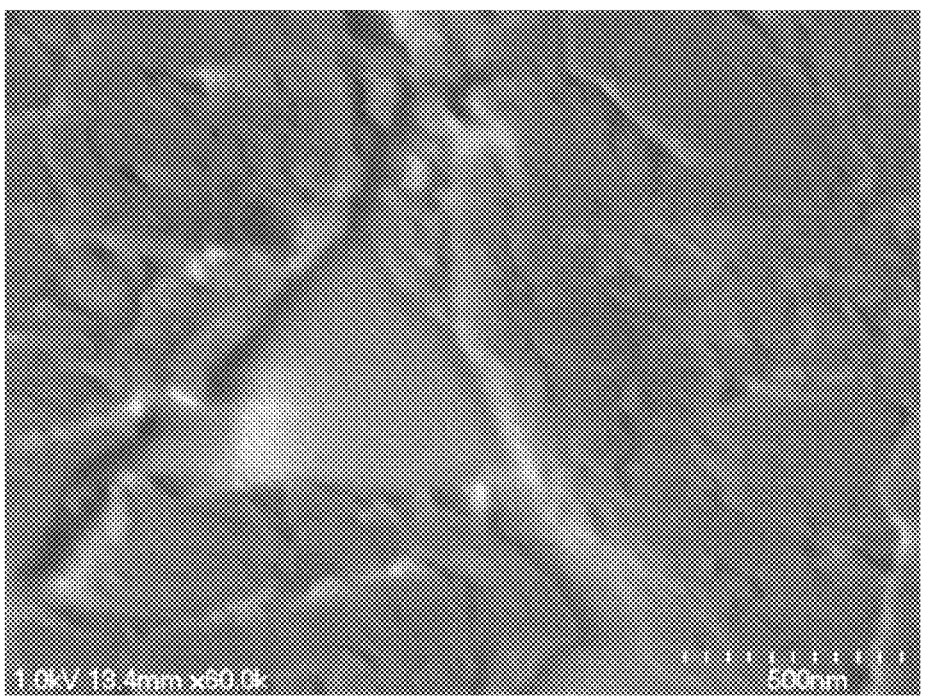
Figure 23A:
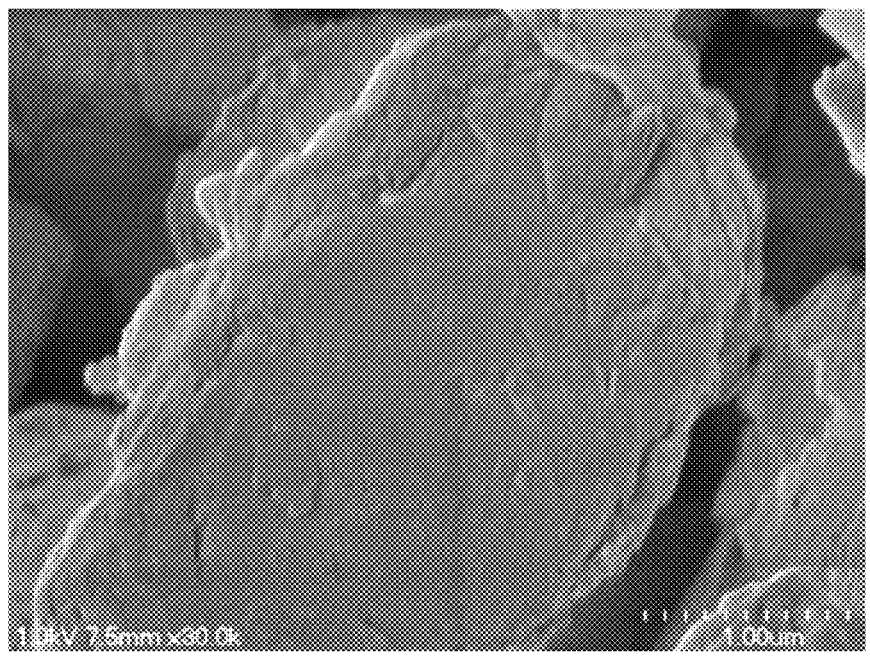
Figure 23B:
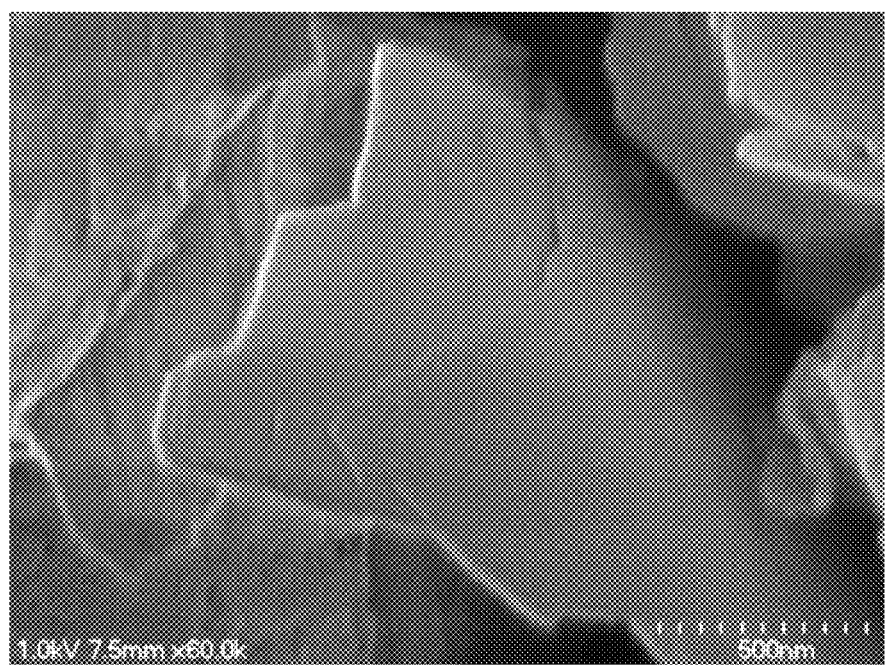
Figure 24A:
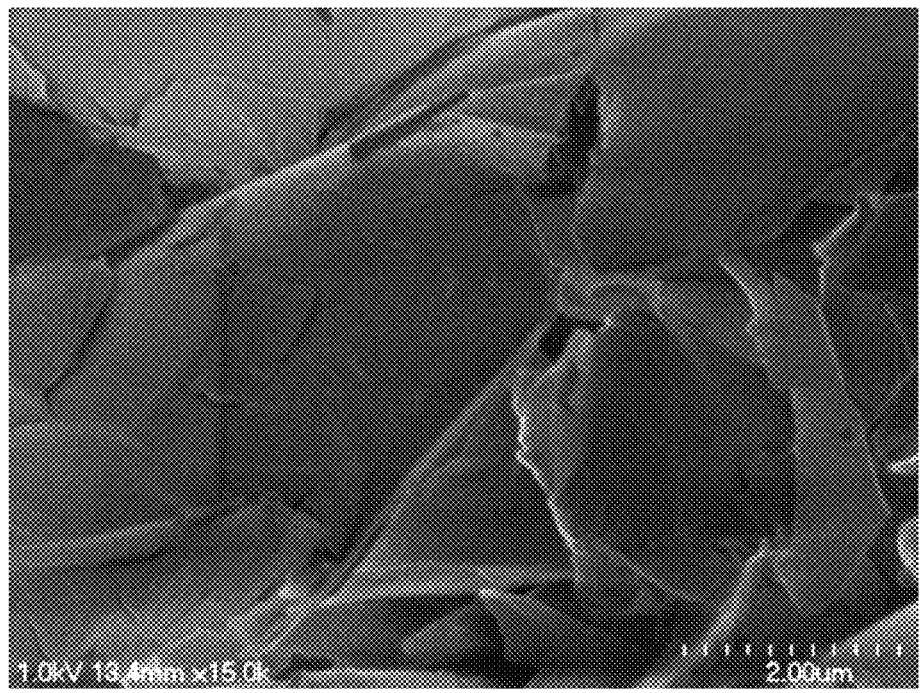
Figure 24B:
Figure 25A:
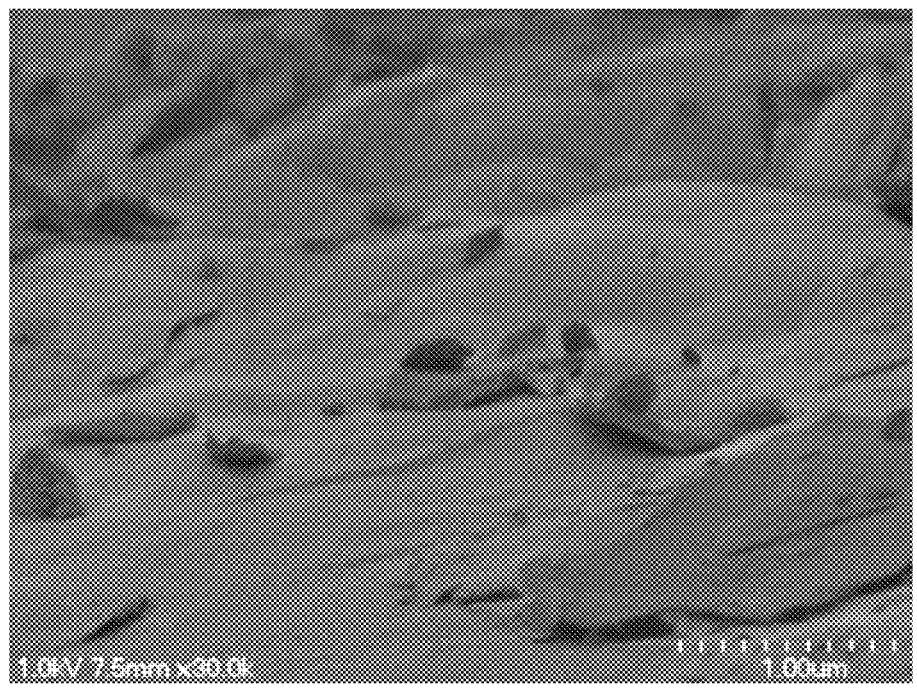
Figure 25B:
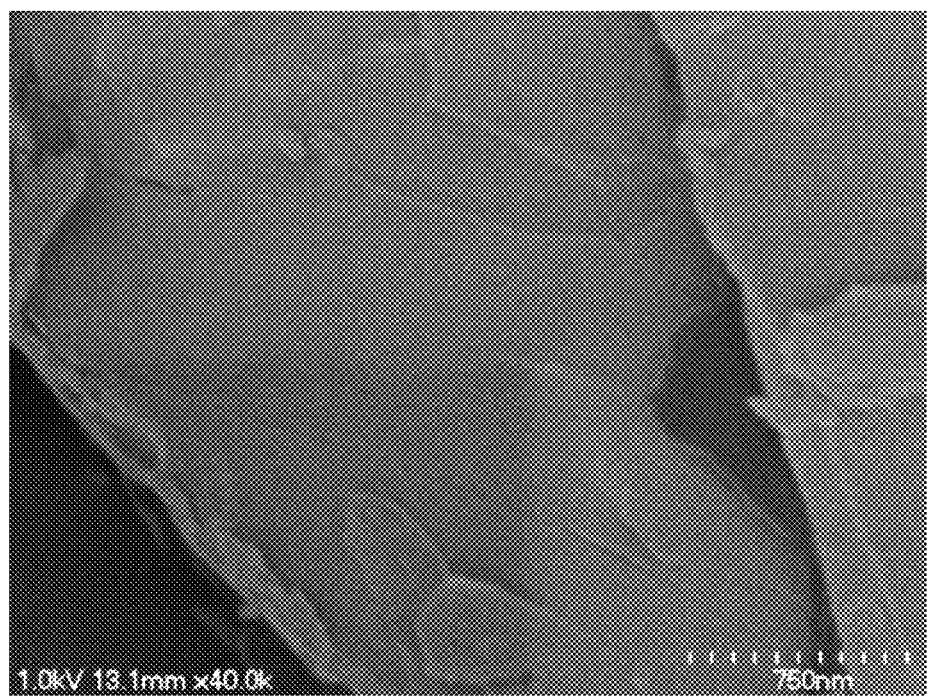
Figure 26:
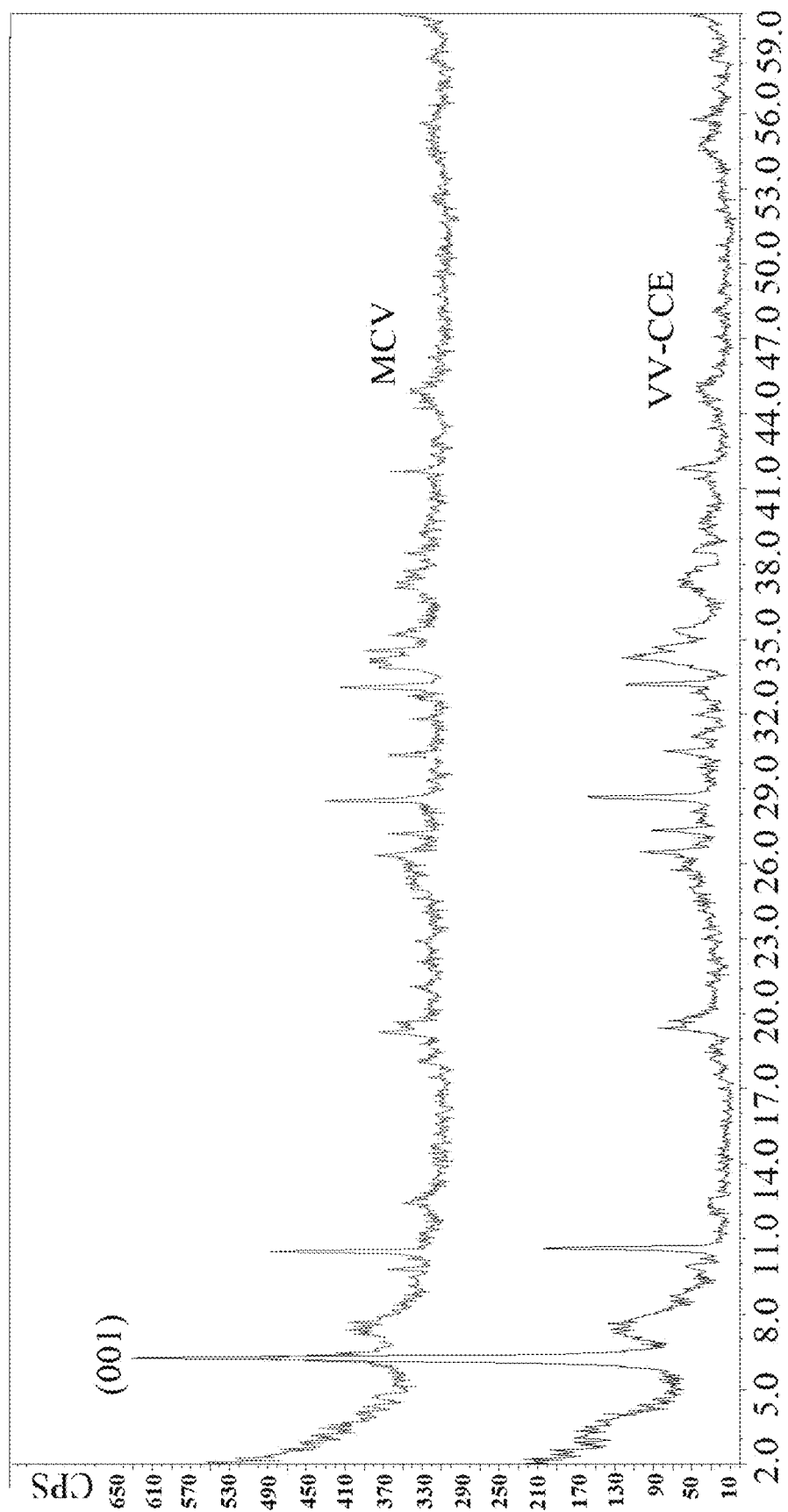
Figure 27:
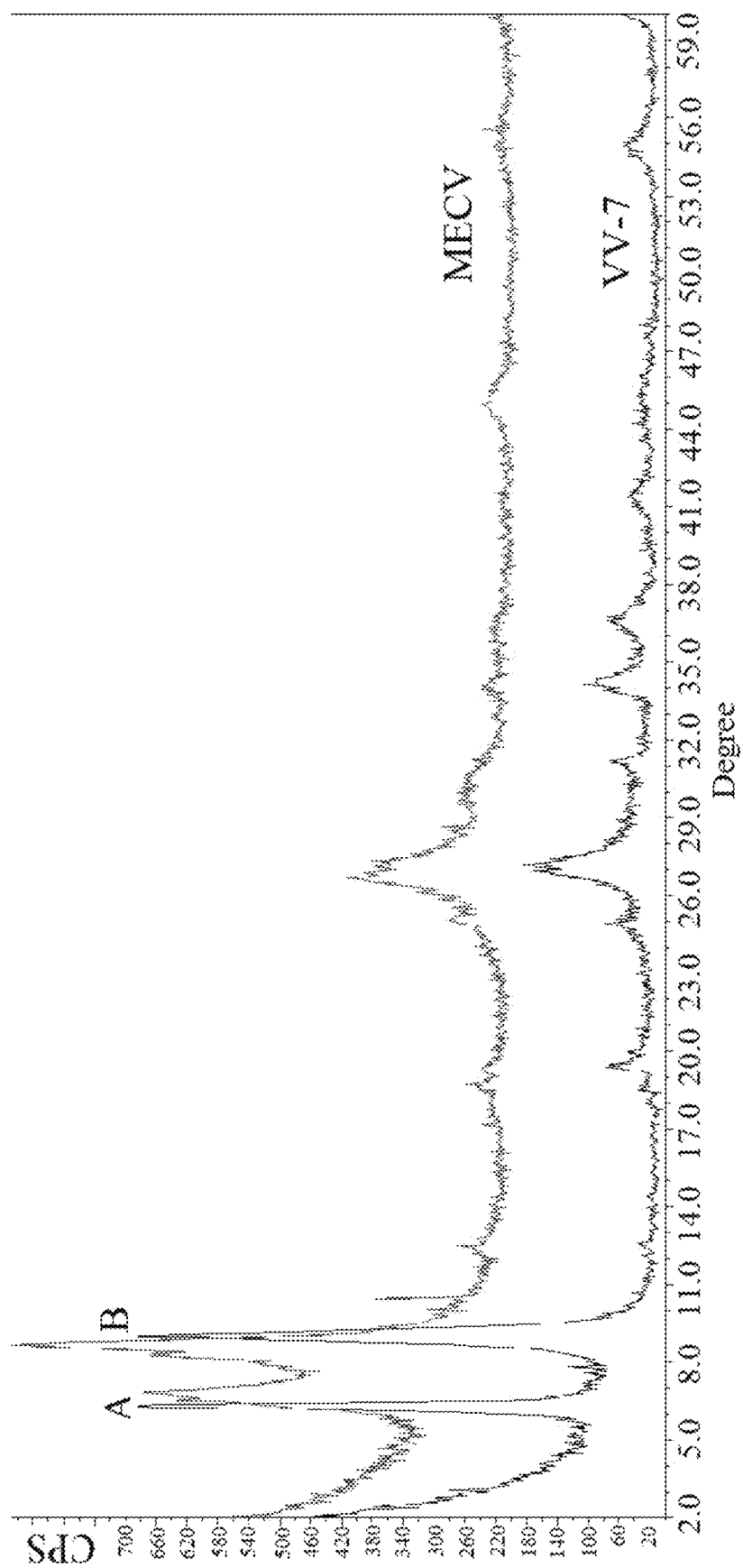
Figure 28:
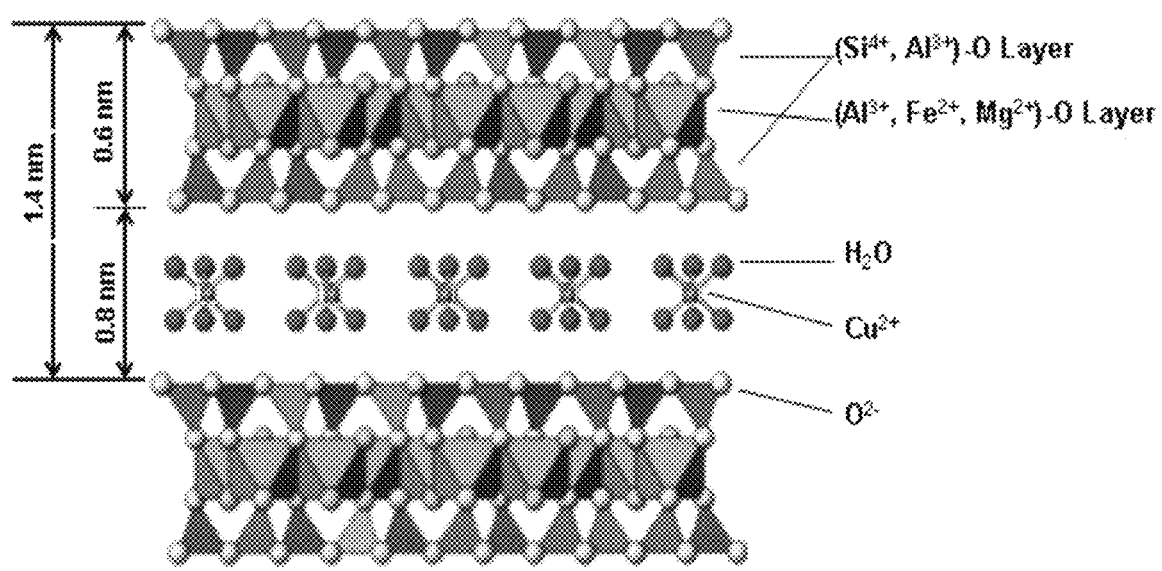
Figure 29:
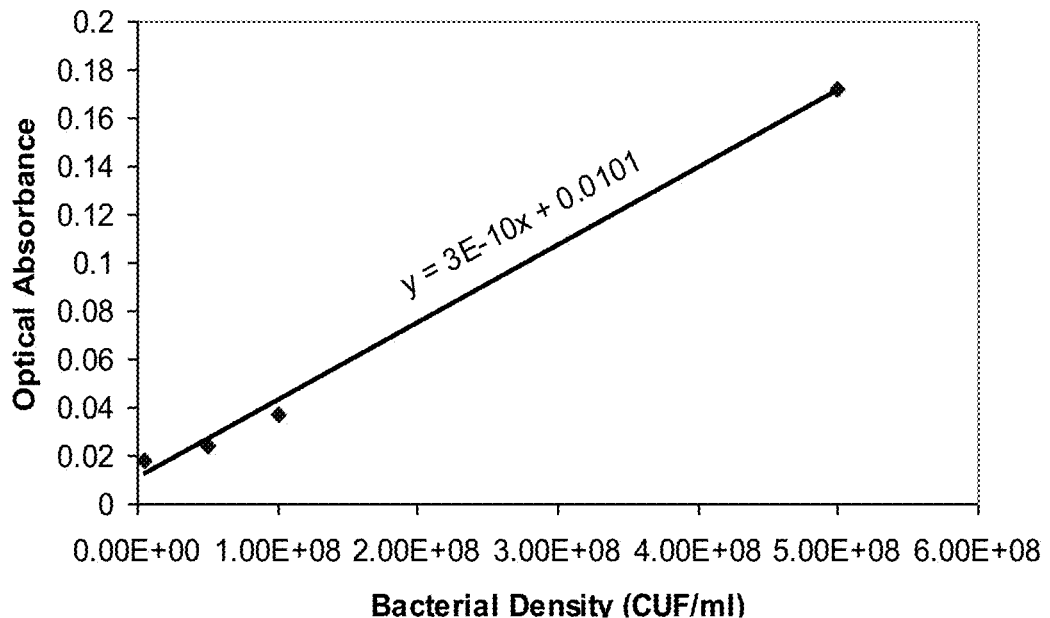
Figure 30:
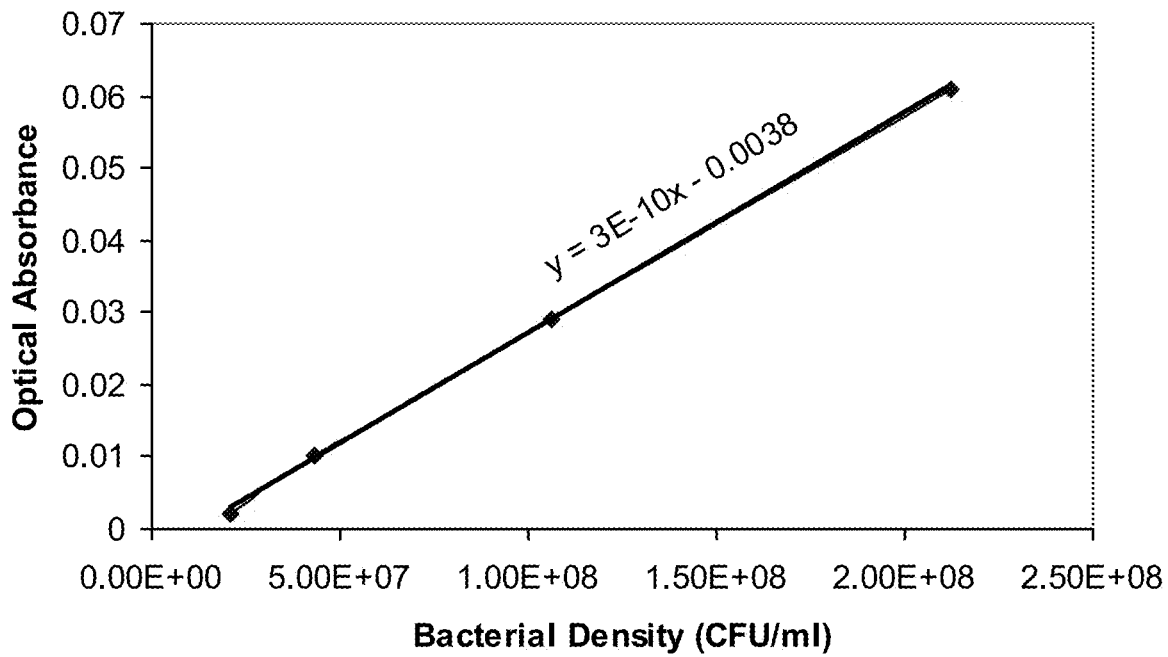
Figure 31:
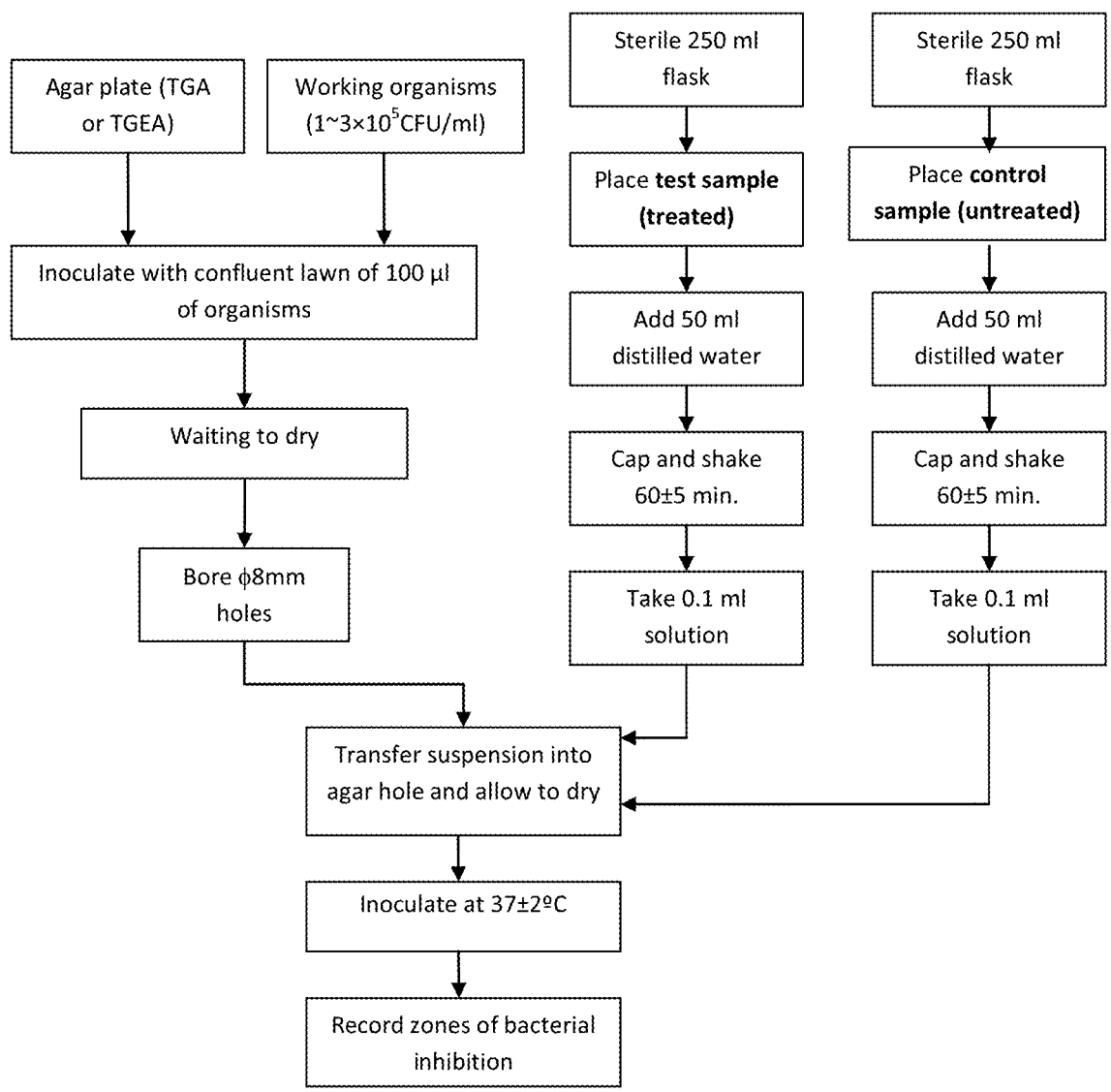
Figure 32:
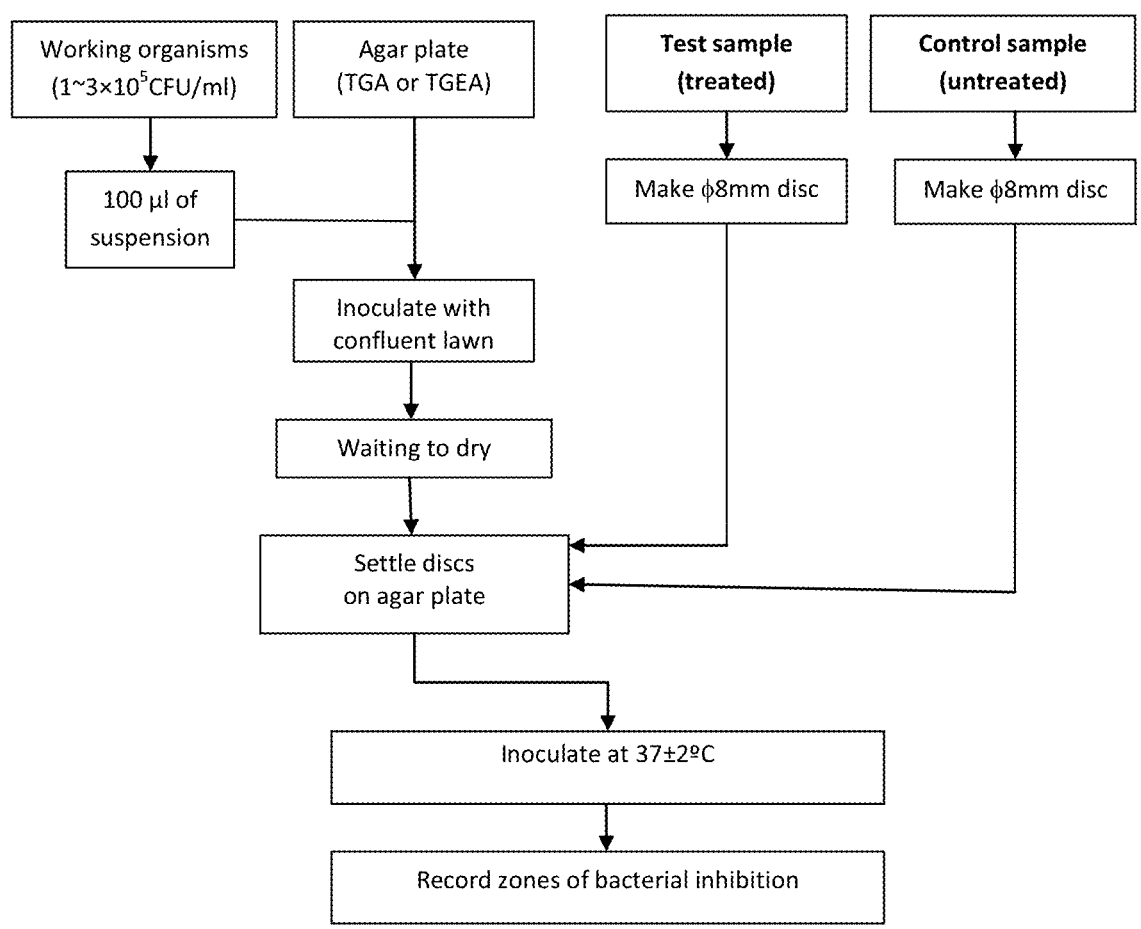
Figure 33:
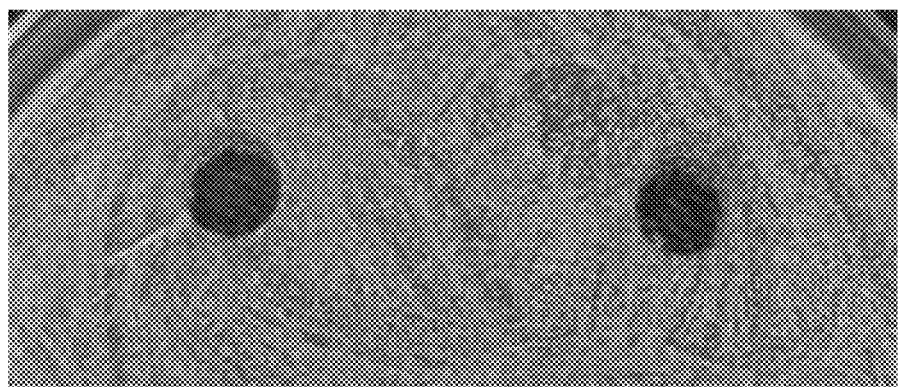
Figure 34:
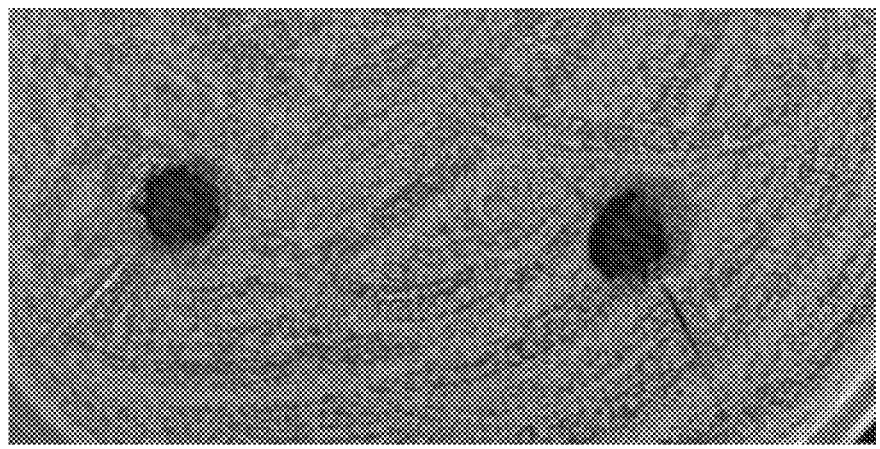
Figure 35:
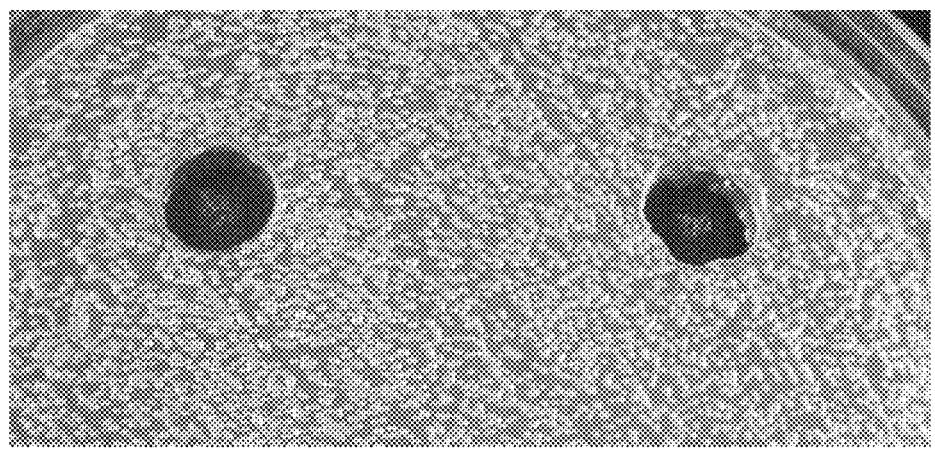
Figure 36:
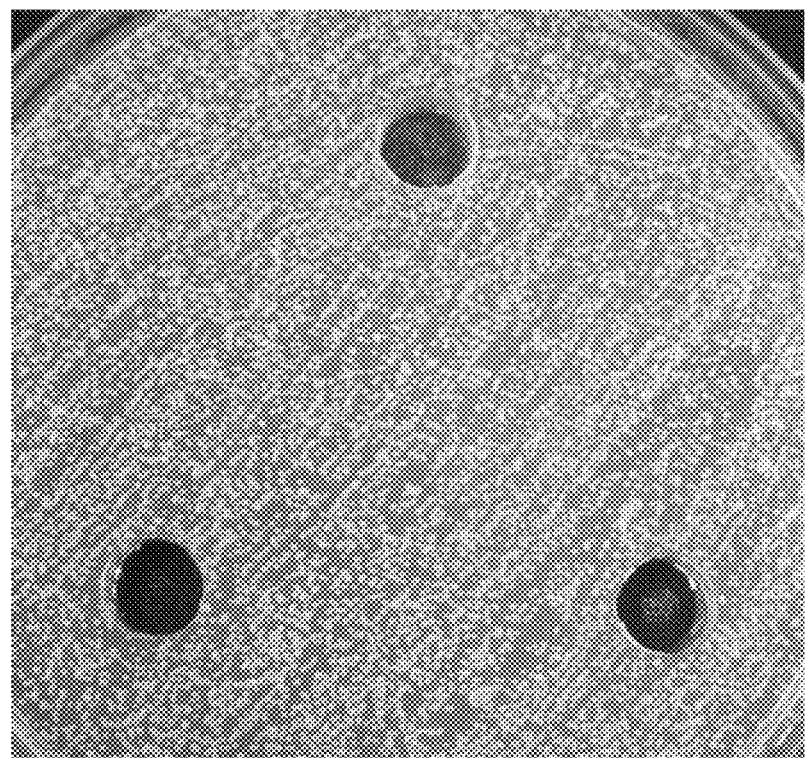
Figure 37:
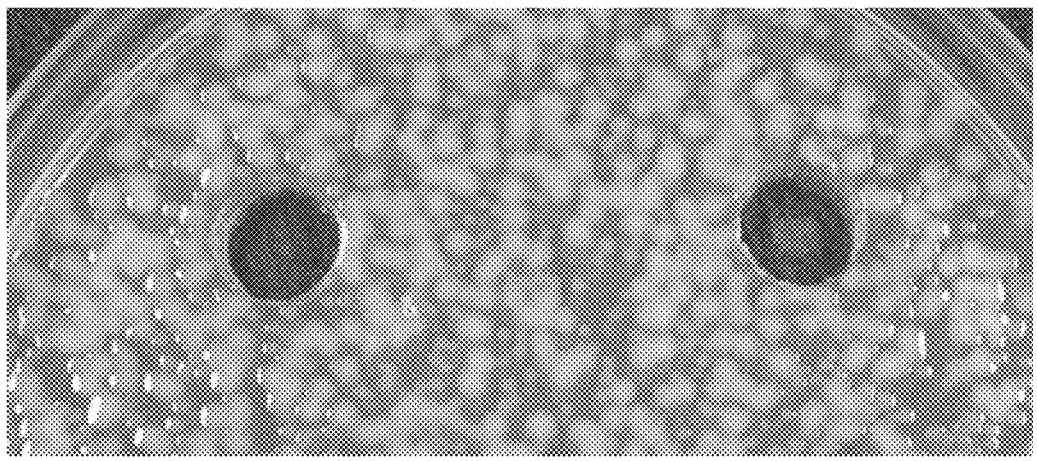
Figure 38:
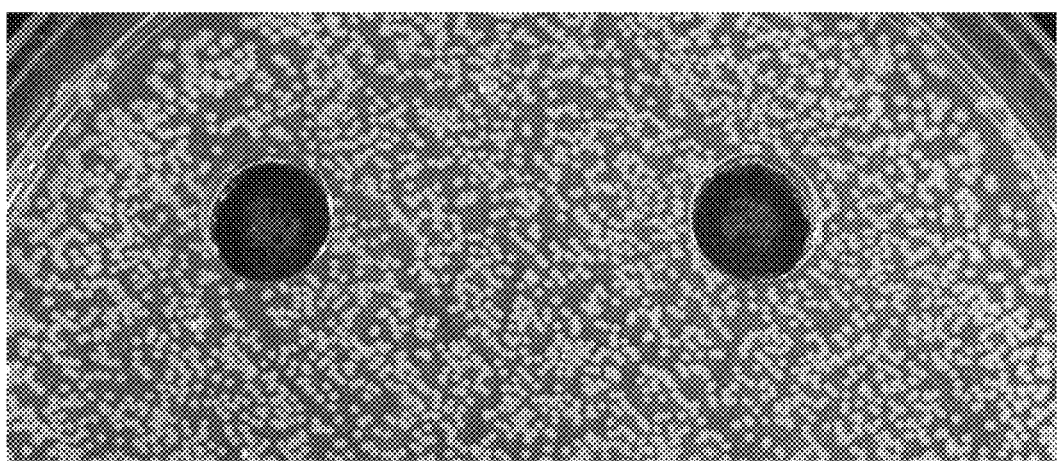
Figure 39:
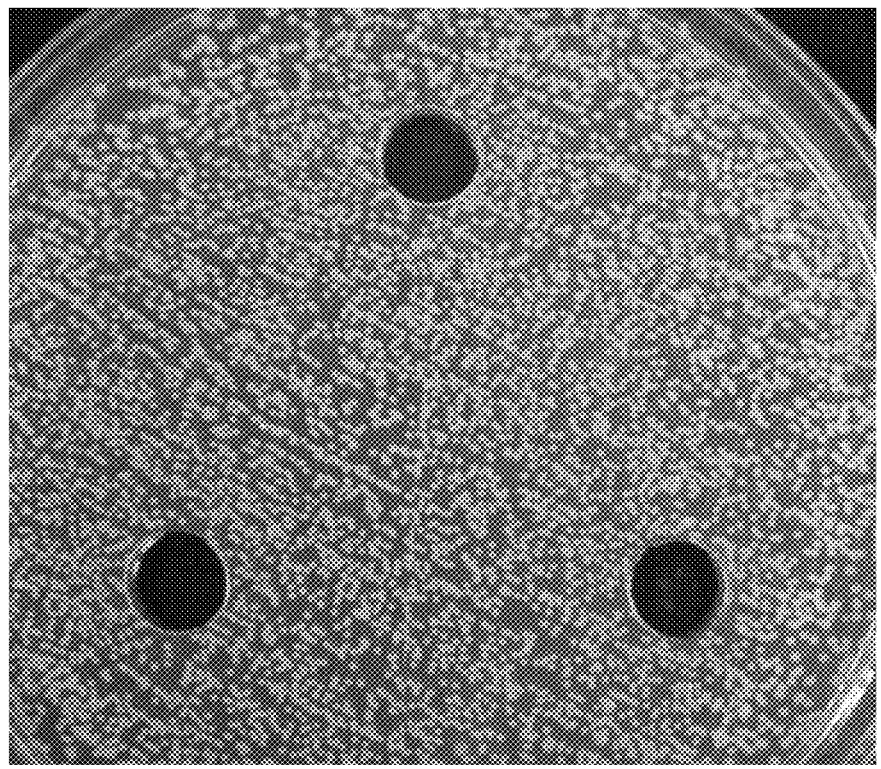
Figure 40:
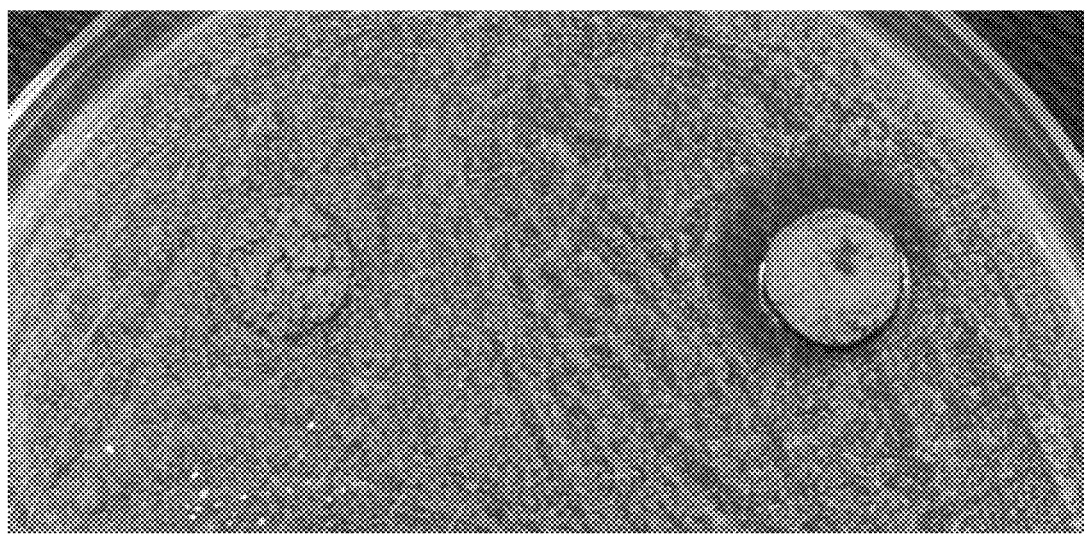
Figure 41:
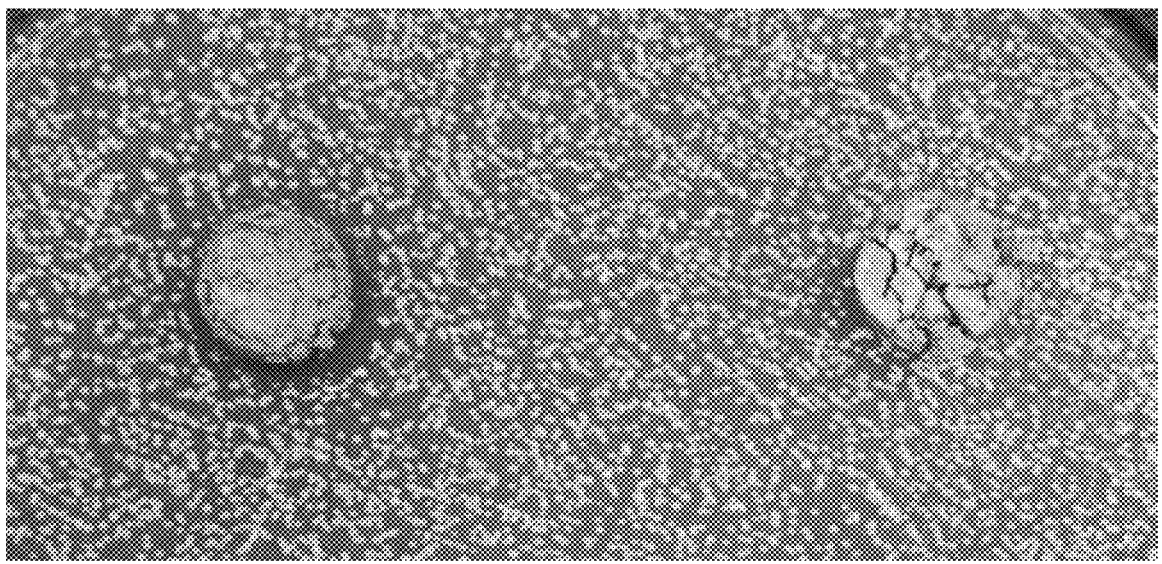
Figure 42:
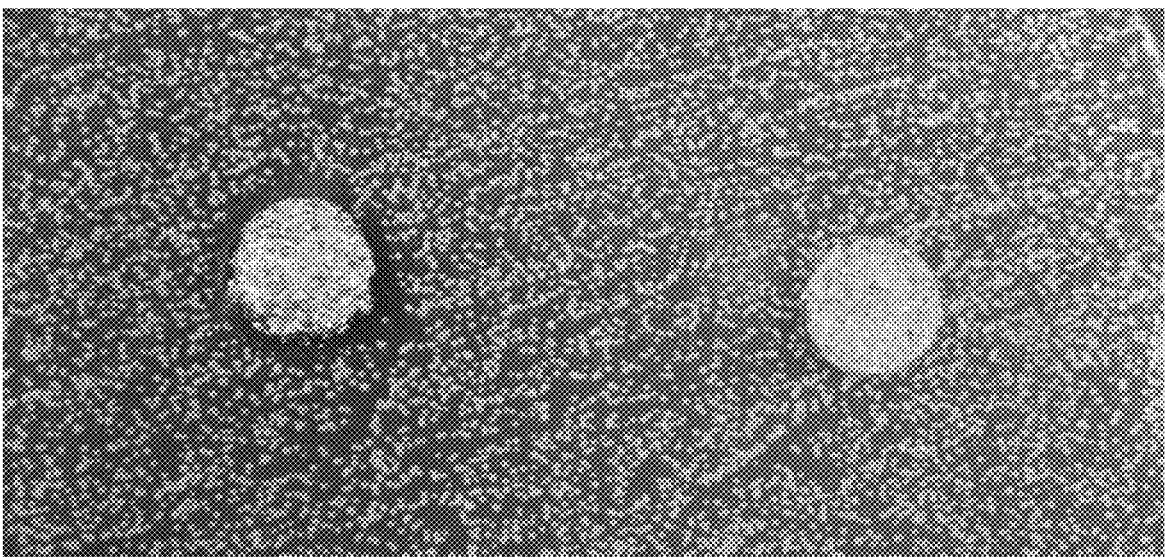
Figure 43A:
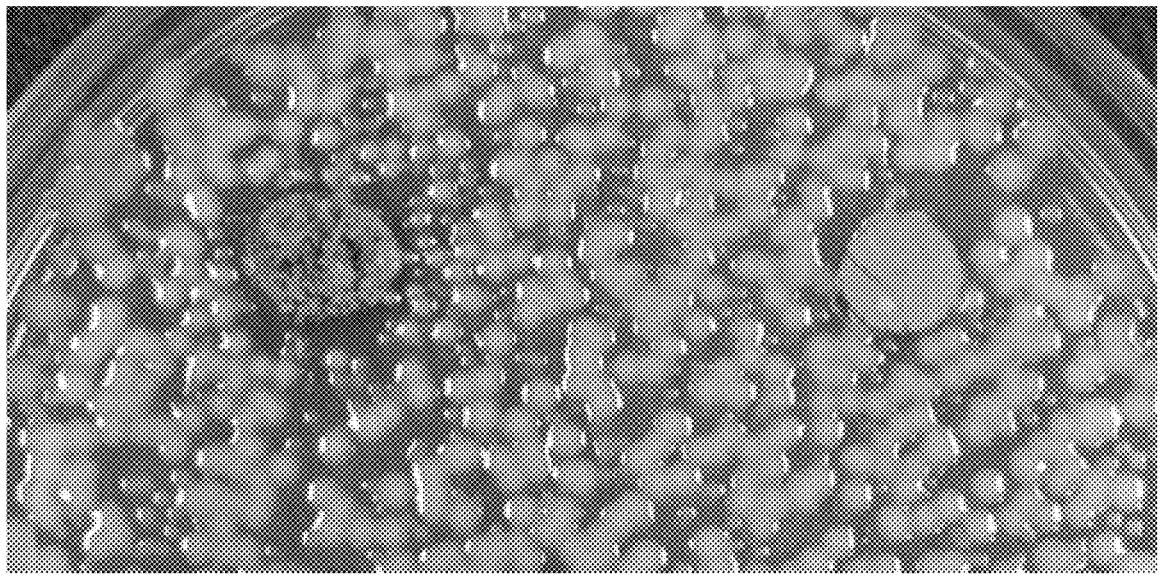
Figure 43B:
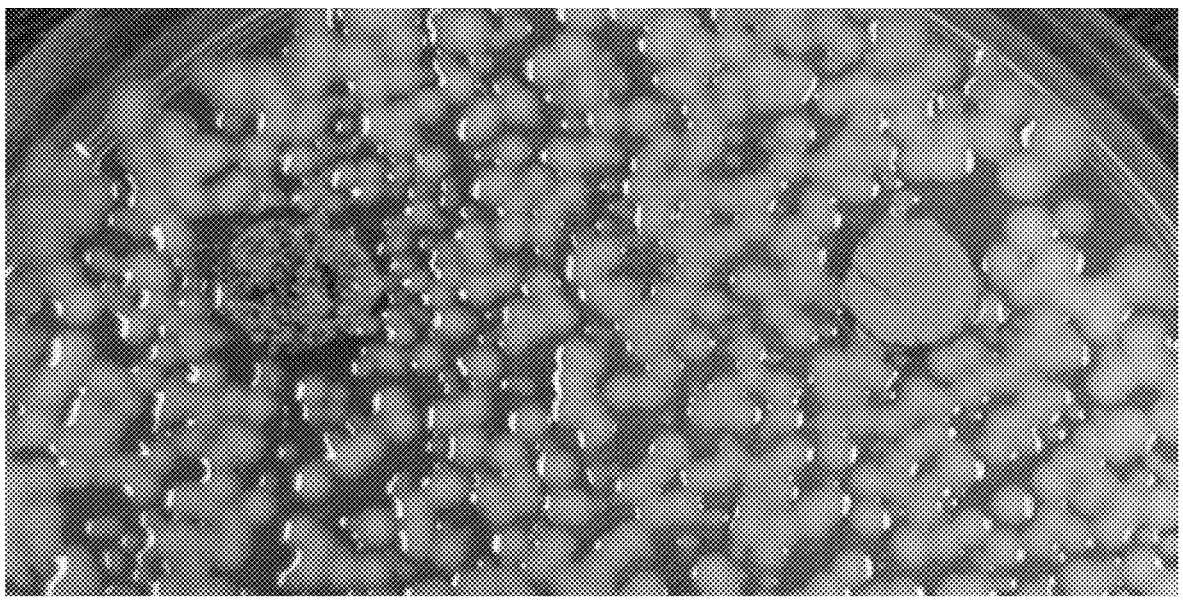
Figure 44A:
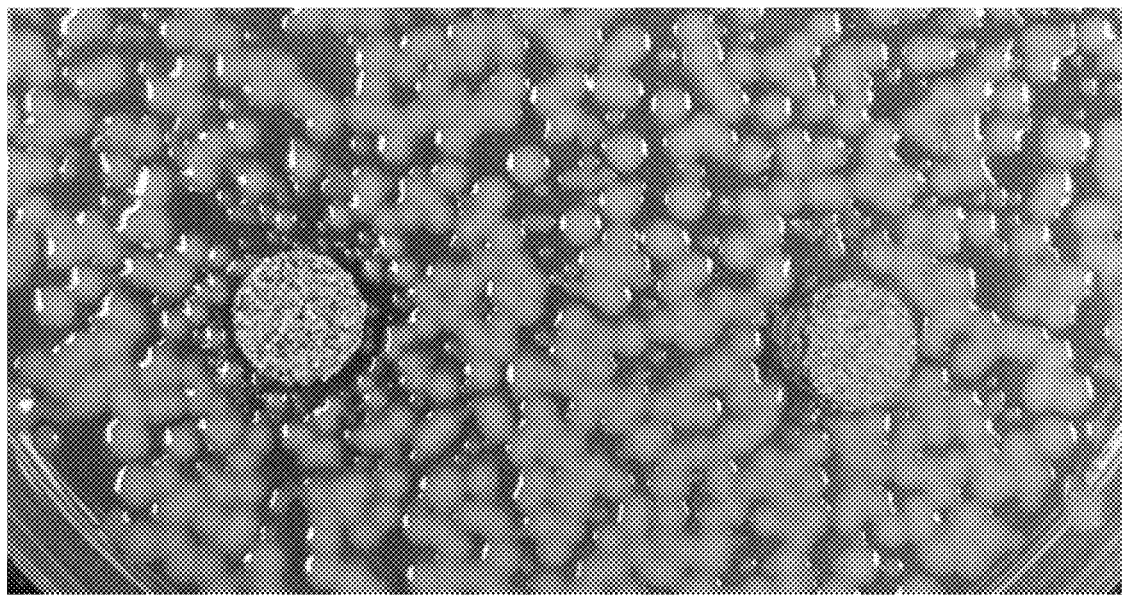
Figure 44B:
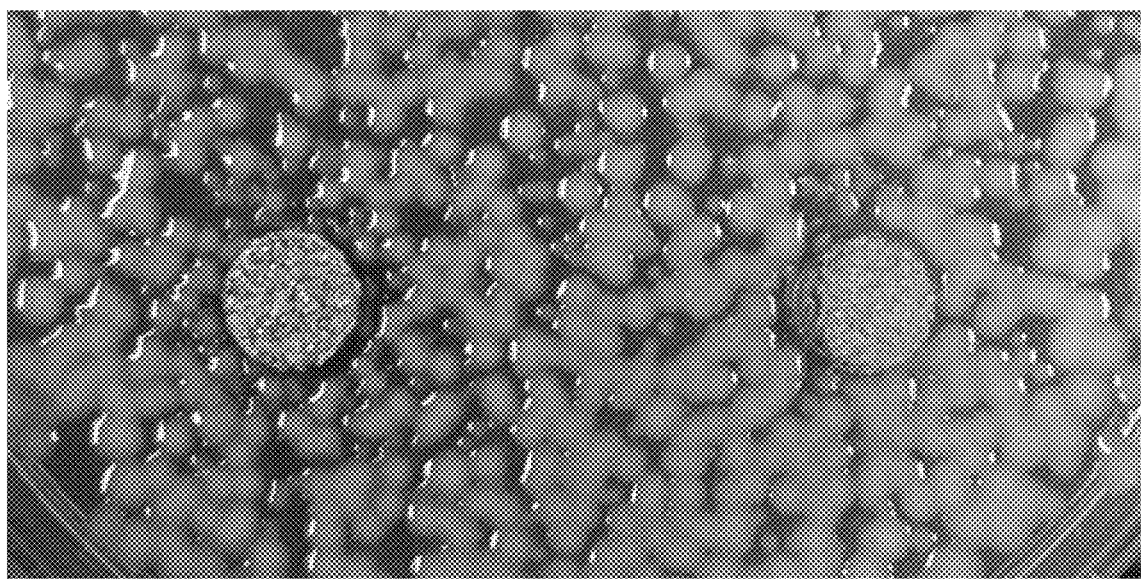
Figure 45:
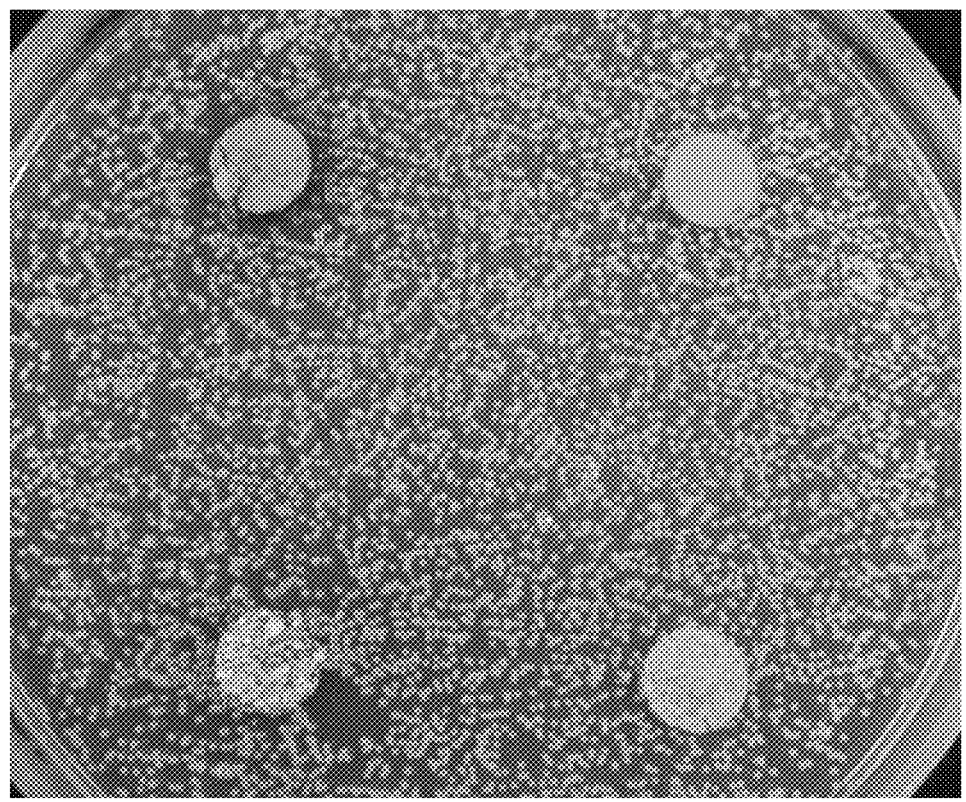
Figure 46:
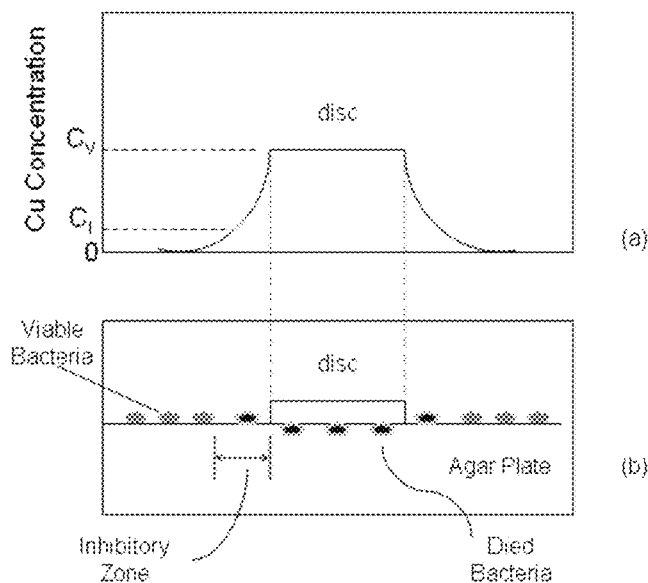
Figure 47:
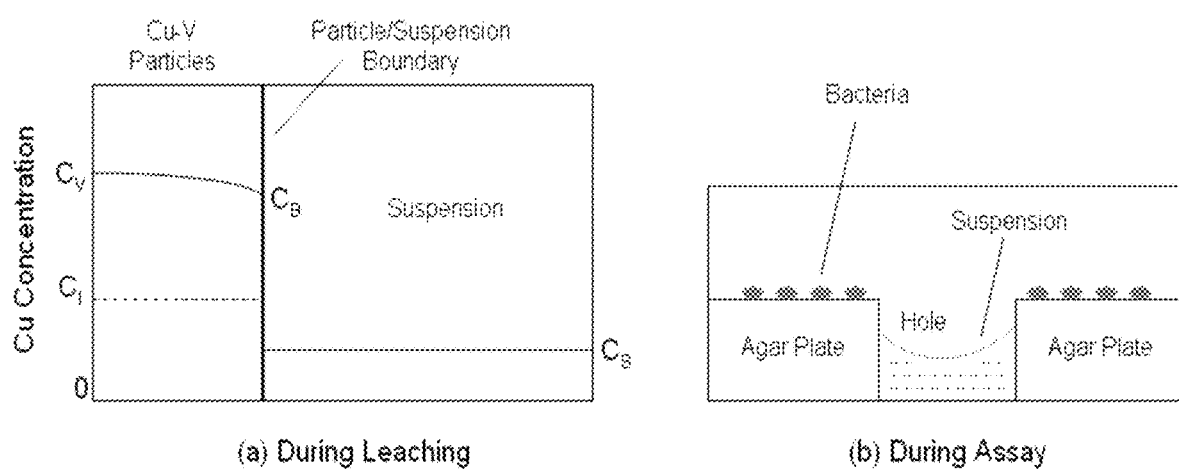
Figure 48:
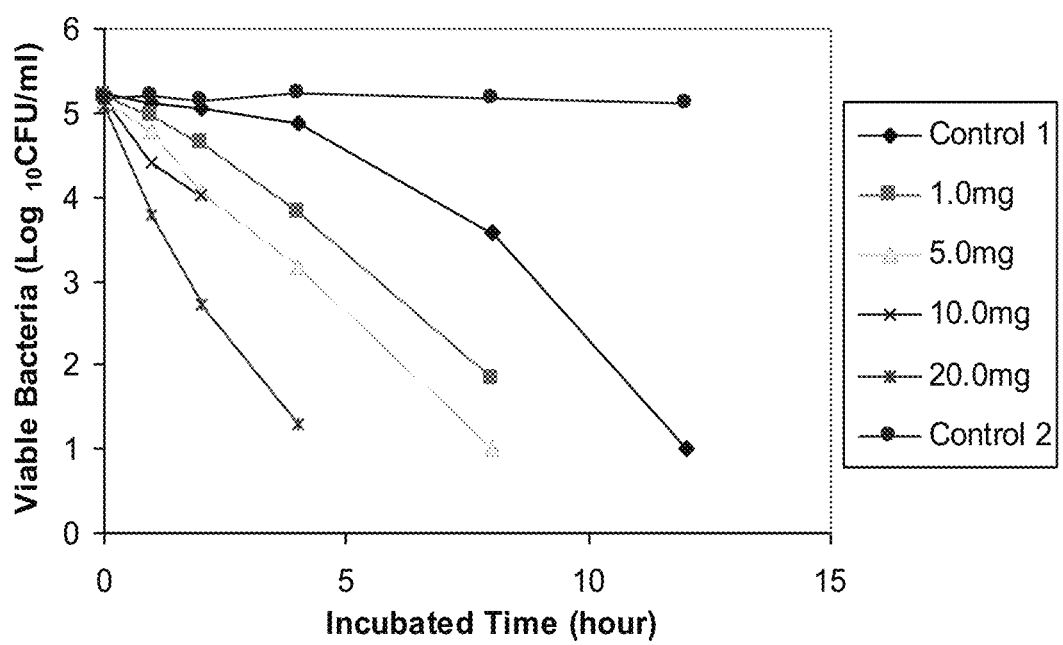
Figure 49:
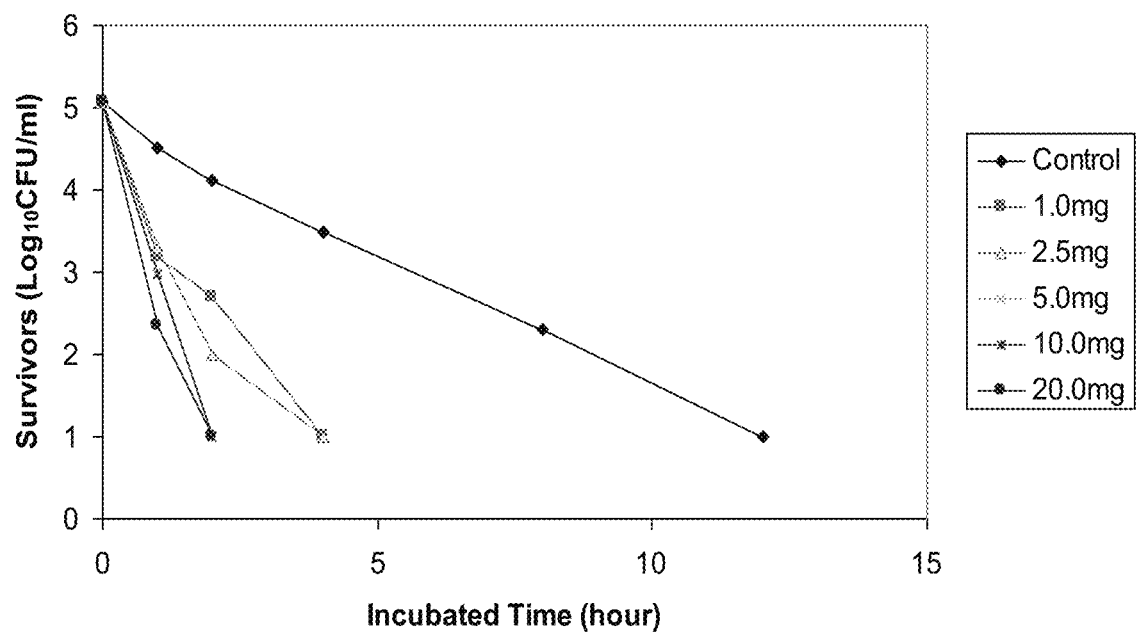
Figure 50A:
Figure 50B:
Figure 50C:
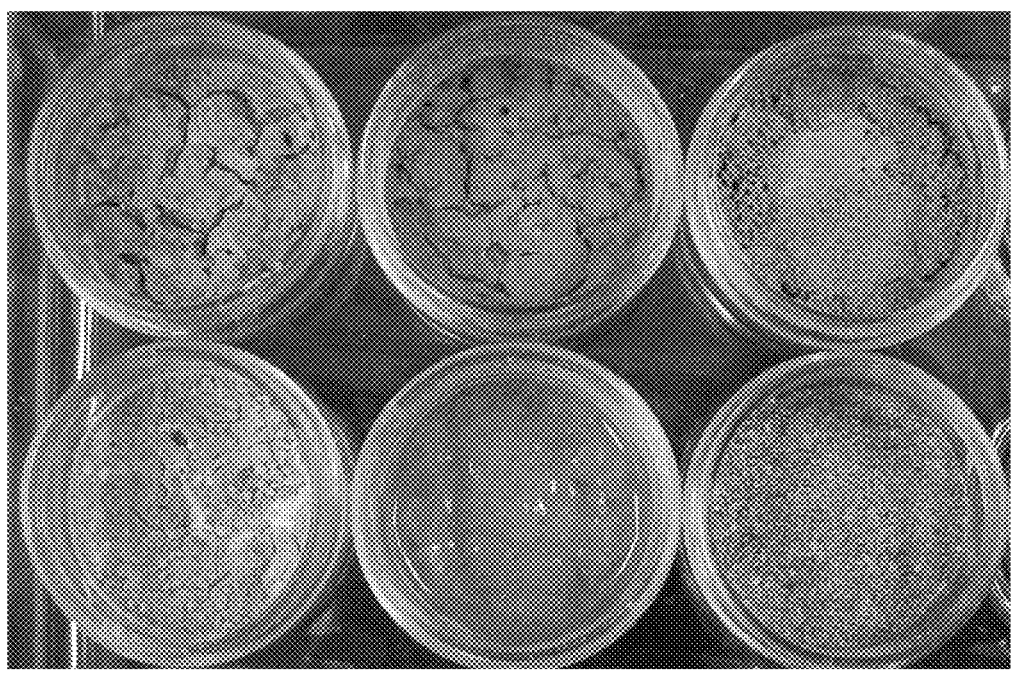
Figure 51:
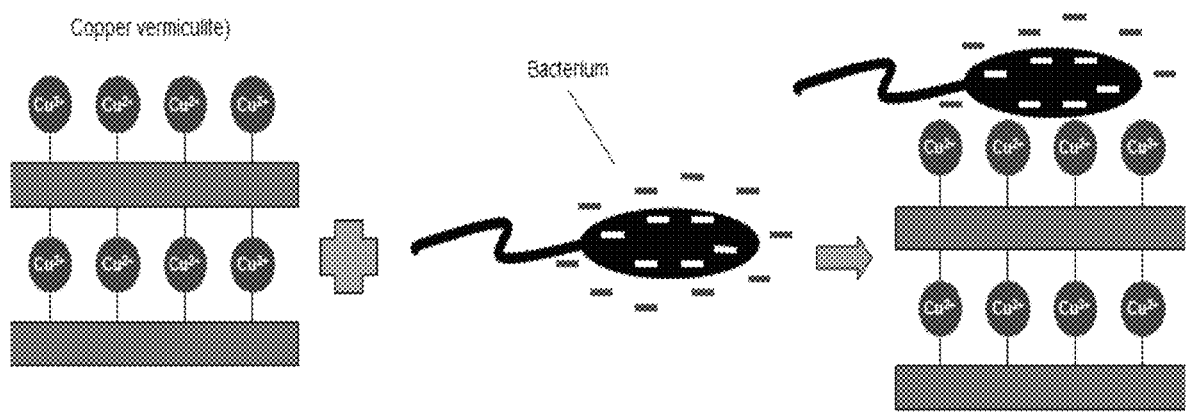
Figure 52:
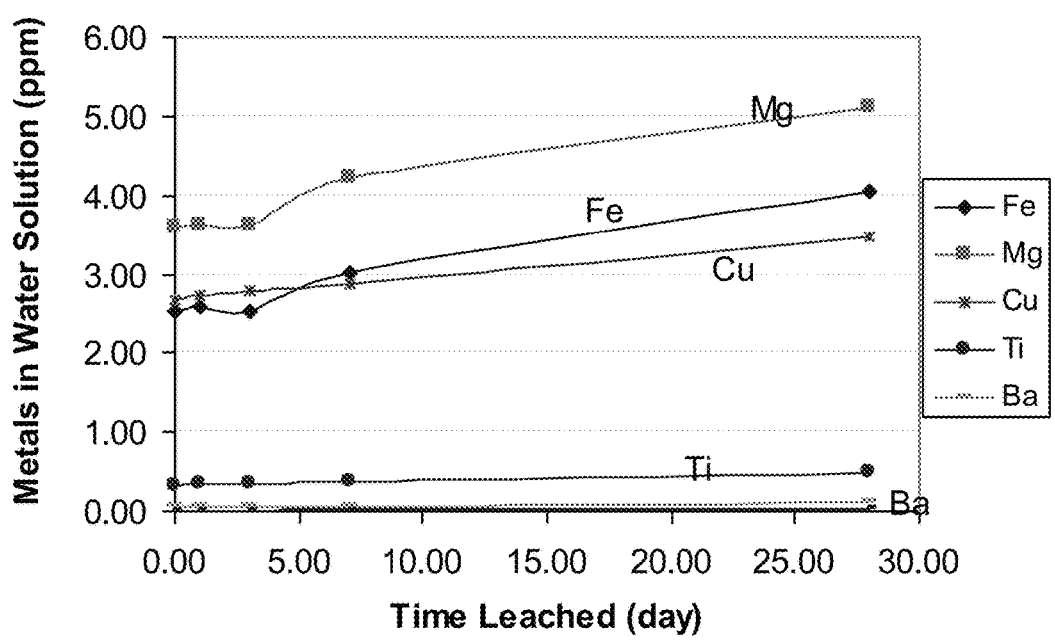
Figure 53:
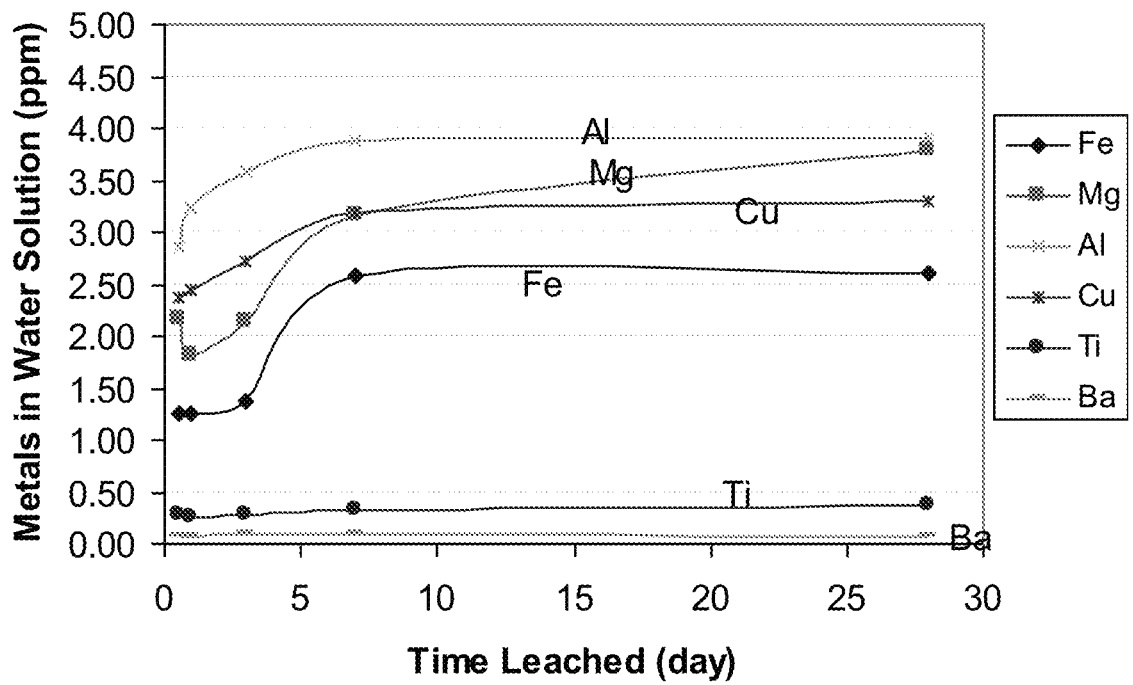
Figure 54:
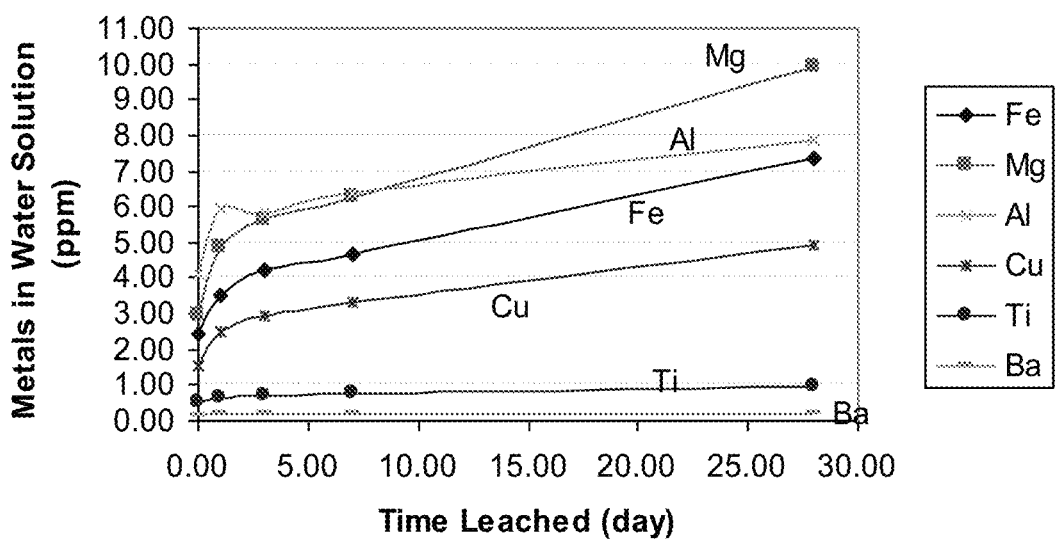
Figure 55:
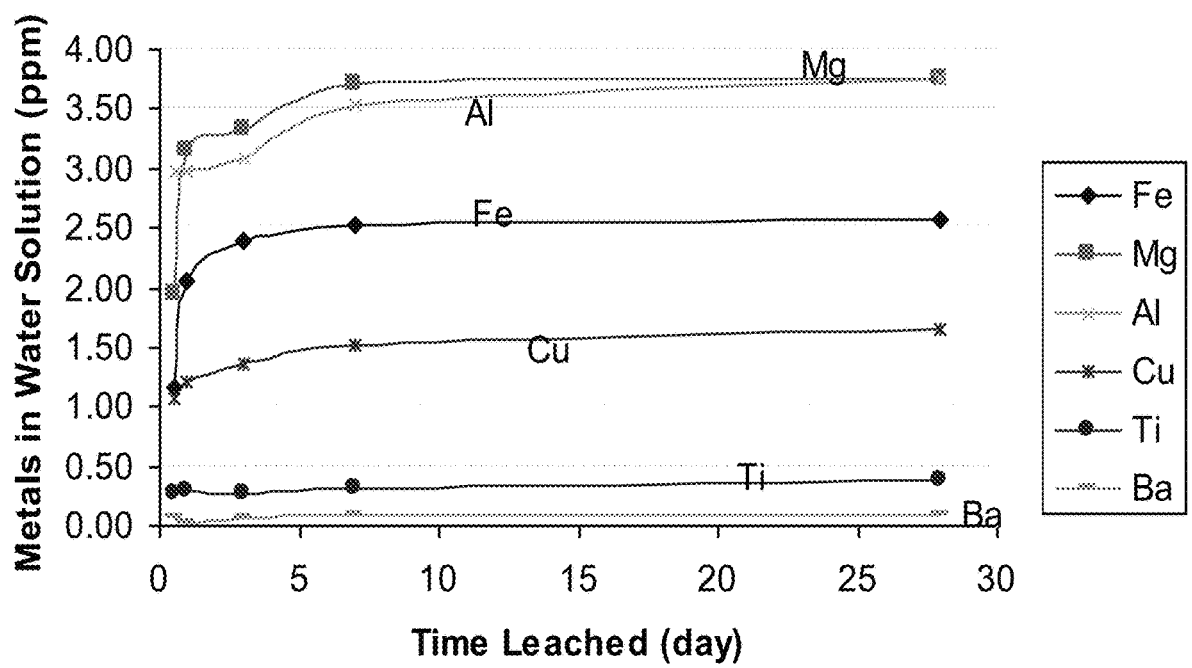
Figure 56:
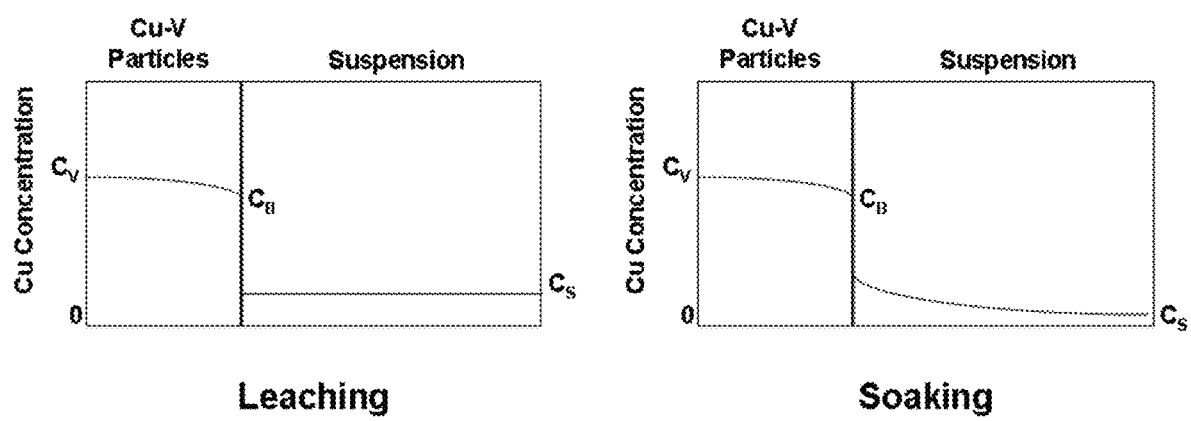
Figure 57:
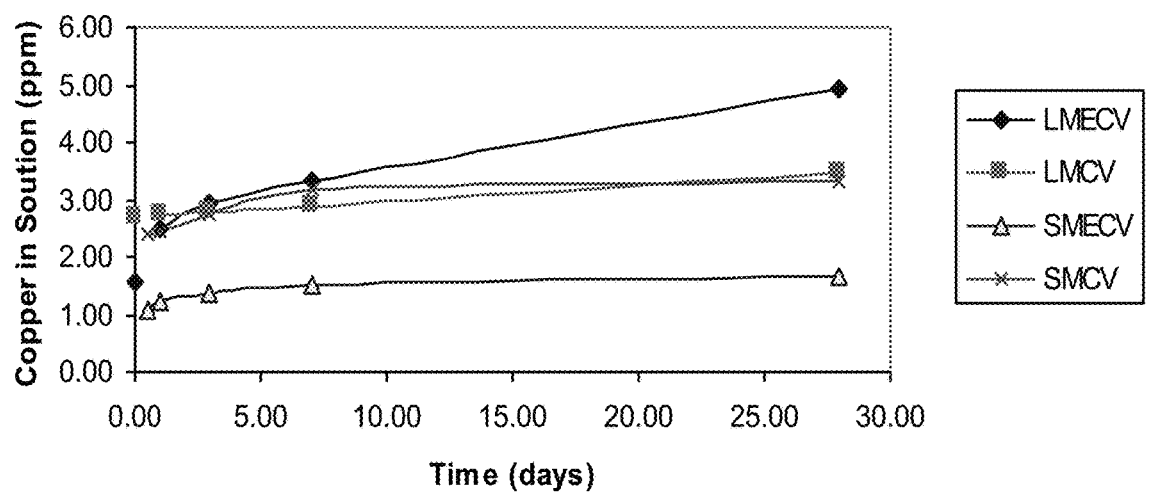

FIG. 6 shows the differential thermal analysis of exfoliated vermiculite. Exfoliated vermiculite absorbs heat only gradually.

The entirety of the research work (85 pages) is disclosed following. Figures of X-ray diffraction (XRD) patterns generated understandably may not show very legible coordinates but nonetheless serve their purpose of showing relevant trends or behavior of the vermiculite material and are explained in the text. For convenient referencing, please adjust the page nos. in the Table of Contents section accordingly.

We claim:

1. A hard surface made up of a material having an antimicrobial exfoliated vermiculite ground composite additive material effective as a sanitizer embedded therein, said exfoliated vermiculite additive material impregnated with a metal species of at least one selection from a group consisting of copper, silver, zinc, nickel, and manganese;

said metal species impregnated into dry exfoliated vermiculite by preparing a metal species solution in a ratio of 0.01-1.0 moles metal species per liter of water and blending said solution into said dry vermiculite in a ratio between 1:5 and 1:100 wherein said ratio is based on grams of said dry vermiculite and ml of said metal solution, said blended material thereby containing copper or other of said metal species in said group and vermiculite, filtering said blended material, washing said blended material with distilled water to remove acidic anions, said washed exfoliated vermiculite being dried into a cake and then ground into a powder, said metal species thereby being in an ionic state, said impregnated ground exfoliated vermiculite thereby being effective to safely sanitize said hard surface by being mixed into said material making up said hard surface, said exfoliated vermiculite antimicrobial additive material slowly releasing antimicrobial cations, and thus providing sanitizing of said hard surface.

2. The composite ground material according to claim 1 wherein said metal species are nanometer sized particles.

\* \* \* \* \*